(12) United States Patent
Sato et al.

(10) Patent No.: US 7,152,230 B2
(45) Date of Patent: Dec. 19, 2006

(54) STORAGE MEDIA STORING DATA RELATED TO SMART CARD, SMART CARD SYSTEM AND SMART CARD APPLICATION LOADING METHOD

(75) Inventors: Akiko Sato, Kawasaki (JP); Yusuke Mishina, Kunitachi (JP); Minoru Ashizawa, Tokyo (JP); Masaru Ohki, Tokorozawa (JP); Nikkou Kaku, Yokohama (JP); Shohei Takeuchi, Yokohama (JP); Hirohiko Kurokawa, Tokyo (JP); Shinichi Hirata, Zushi (JP)

(73) Assignees: Hitachi, Ltd., Tokyo (JP); Nippon Telegraph and Telephone Corporation, Tokyo (JP)

( * ) Notice: Subject to any disclaimer, the term of this patent is extended or adjusted under 35 U.S.C. 154(b) by 321 days.

(21) Appl. No.: 09/940,663

(22) Filed: Aug. 29, 2001

(65) Prior Publication Data
US 2002/0056079 A1    May 9, 2002

(30) Foreign Application Priority Data
Nov. 9, 2000  (JP)  ............................. 2000-341931

(51) Int. Cl.
G06F 9/445 (2006.01)
G06F 7/04 (2006.01)
H04L 9/32 (2006.01)
(52) U.S. Cl. .......................................... 717/178; 726/9
(58) Field of Classification Search ........ 717/168–178; 238/380, 492; 726/4, 5, 7, 9, 17, 20
See application file for complete search history.

(56) References Cited

U.S. PATENT DOCUMENTS 5,569,897 A  10/1996  Masuda
5,923,884 A * 7/1999 Peyret et al. ................ 717/167
5,991,413 A * 11/1999 Arditti et al. .................. 705/77
6,003,113 A * 12/1999 Hoshino ...................... 711/106
6,199,762 B1* 3/2001 Hohle .......................... 235/492
6,296,191 B1* 10/2001 Hamann et al. ............. 235/492
6,317,832 B1* 11/2001 Everett et al. ............... 713/172
6,651,884 B1* 11/2003 Prendergast et al. ........ 235/380

FOREIGN PATENT DOCUMENTS

| JP | 01-147666   | 12/1987  |
| JP | 7-210730    | * 1/1994 |
| JP | 2000-036015 | 7/1998   |
| JP | 2000-148928 | 11/1998  |

* cited by examiner

Primary Examiner—Mary Steelman
(74) Attorney, Agent, or Firm—Reed Smith LLP; Stanley P. Fisher, Esq.; Juan Carlos A. Marquez, Esq.

(57) ABSTRACT

A method, by which if a reissued smart card is issued based on an old smart card, the application program loaded in the old smart card is smoothly reloaded in the reissued smart card, is disclosed. Its specific configuration will be described as below. A method for loading an application program in a smart card comprises the steps of: in response to a request for loading one application program for a smart card in the smart card that has been reissued based on an old smart card, judging whether or not said one application program was loaded in the old smart card, according to a relationship between a card id of the reissued smart card and a card id of the old smart card; and if it is found out that said one application program was loaded, loading said one application program in the reissued smart card.

9 Claims, 14 Drawing Sheets

FIG. 12

| HEADER | PLATFORM TYPE | OLD CARD ID | REISSUED CARD ID |
|---|---|---|---|

FIG. 13

| # | OLD CARD ID | REISSUED CARD ID |
|---|---|---|
| 1 | 100001 | 987654 |
| 2 | 100018 | 333333 |
| ... | ... | ... |

FIG. 14

| # | CARD ID | USER NAME | EXAMINATION INFORMATION | ACCOUNTING INFORMATION | APPLICATION ID LOADED ON CARD |
|---|---|---|---|---|---|
| 1 | 100001 | JOHN SMITH | $3,000 | ... | [111,222,333] |
| 2 | 100002 | ICHIRO SUZUKI | $5,000 | ... | [222] |
| ... | ... | ... | ... | ... | ... |

FIG. 15

| HEADER | PLATFORM TYPE | CAPABILITY TO REISSUE OK/NG ? | MESSAGE ID |

FIG. 16

| # | CAPABILITY TO REISSUE OK/NG ? | MESSAGE ID |
|---|---|---|
| 1 | OK | 123456789 |
| 2 | NG | — |
| ... | ... | ... |

FIG. 17

| # | MESSAGE ID | USER NAME | EXAMINATION INFORMATION | ACCOUNTING INFORMATION | APPLICATION ID LOADED ON CARD |
|---|---|---|---|---|---|
| 1 | 123456789 | JOHN SMITH | $3,000 | ... | [111,222,333] |
| ... | ... | ... | ... | ... | ... |

STORAGE MEDIA STORING DATA RELATED TO SMART CARD, SMART CARD SYSTEM AND SMART CARD APPLICATION LOADING METHOD

BACKGROUND OF THE INVENTION

The present invention relates to a storage medium for storing data relating to a smart card system, a smart card system, and a method for loading an application program in a smart card. More specifically, the present invention relates to a smart card system that issues and manages a smart card, and that executes and manages services loaded in the smart card, a storage medium used for the system, and the like. More specifically, the present invention relates to a smart card system having a function of giving notification, which is required when the smart card is reissued, while retaining security.

The smart card (IC card or smart card) can record a larger quantity of information, and has an advanced security function. Therefore, the smart card is coming into wider use as a new information storage medium, which takes the place of a magnetic card, in recent years. In addition, smart cards and card OS (operation system), which have multiple application functions capable of loading a plurality of applications in a smart card, and a dynamic loading function for loading an application after issuing a card, become mainstream recently.

A general smart card processing device, a smart card processing system, and the like, are described in, for example, Japanese Patent Application Laid-Open No. 2000-36015.

Business relating to issuance of a smart card and provision of services is performed by methods as below. An issuer of a smart card itself often differs from a service provider, by which a program for executing desired operation in the smart card is loaded in the smart card. To be more specific, the card issuer issues a smart card, and the service provider loads the program for executing various kinds of operations in the smart card. Naturally, it is probable that there are the plurality of service providers. By the way, the program for executing desired operation in the smart card is simply referred to as "application" (hereinafter, it is simply abbreviated as AP).

The card issuer holds smart card related data in a database related to a smart card. The card issuer issues the smart cards, and distributes them to users according to desired data of the database. Specific contents of the smart card related data differ depending on each card issuer. For example, the following contents are described: application information from a user; and basic information required for card issuance, which includes, for example, name, sex, age, occupation, income, and address. In addition, the service provider performs issuance and management of an application loaded on a smart card using a service providing/managing system for the smart card. The service provider makes or obtains an application to be loaded on the smart card, and loads the application in the smart card. Application data is stored in a smart card application management database.

There are the following application loading: application loading in a smart card at the time of issuance of a smart card, of which service execution has already been enabled; and dynamic loading that loads an application after issuance of a card. However, it is thought that the dynamic loading, by which a user loads an application in the smart card from a terminal unit of the service provider, becomes mainstream in future.

SUMMARY OF THE INVENTION

An object of the present invention is to provide a smart card system and a storage medium used for this, which reduce loads of a smart card user and a service provider and retain security when reloading an application in a reissued smart card.

In the case of dynamic loading by which the user loads an application in a smart card from a terminal unit of the service provider, there is an external terminal, which exchanges the smart card and a command, on the client side of the service provider. As described above, because a card issuer has all responsibilities on the smart card, in most cases the service provider is not permitted to load an application freely from the terminal.

For this reason, procedures, by which the card issuer checks validity of the application of which loading is desired, is required. To be more specific, a smart card service providing/managing system requests a smart card issuance/management processing unit of the card issuer to give permission for AP loading through an "application issuance/management processing unit" for the smart card service providing/managing system's own smart card. Data relating to AP is stored in a smart card management database beforehand. Whether or not a requested application is illegal, and whether or not a requesting service provider is illegal, and the like, are checked before issuing permission for AP loading. Although the AP loading permission may be exchanged between the card issuer and the service provider using a floppy disk (hereinafter it is abbreviated as FD) or a document, the AP loading permission is usually exchanged online as an electronic message through a network (hereinafter, this electronic message is referred to as "message"; in addition, id for identifying this message uniquely is called "message id"). The service provider achieves installation of the application by transmitting the received AP loading permission together with the application. The service provider, therefore, is required to make a contract with the card issuer beforehand, and to register the following facts at the card issuer beforehand: the service provider itself is a legal company; and the application, which will be loaded, is legal.

It is assumed that a system of the card issuer and a system of the service provider are connected through a network, and that a server and a client are also connected through the network. As a matter of course, exchange is also possible in the forms such as FD and document.

If there are a plurality of managing entities, each of which plays a specific role (for example, if the card issuer issues and manages a smart card and the service provider issues and manages services on the smart card), there are some disadvantages in reissuing a smart card. The present invention provides a method for reloading a desired application (AP) in a reissued smart card promptly while retaining security, and also provides a device capable of achieving this. Current disadvantages will be described as follows.

If a user cannot use a smart card for reasons of a loss, theft, damage, etc. of the smart card, reissuance of the smart card is required. By the way, hereinafter, a smart card, which cannot be used any more, is called "old card", and a newly reissued card is called "reissued card". In addition, loading an application, which was loaded in the old card, in the reissued card is called "application reloading", which is distinguished from normal "application loading".

When the card user applies to the card issuer for reissuance of the smart card, the card issuer compares the reissuance application with its own company policy. If the reissuance application is appropriate, the card issuer reissues the smart card. After that, the card user visits each service provider, and applies for reloading of the application that was loaded in the old card. However, as described above, application loading generally requires permission by the card issuer. Therefore, it is necessary to carry out steps such as permission application from the service provider to the card issuer. In addition, depending on the policy of the service provider and content of the application, there may be for example the following cases: credit investigation of the user is carried out again; the user is newly charged. In such a situation, the user will be burdened with time and a charge, which are required for application loading. In addition to it, the service provider, which carries out the credit investigation and requests the card issuer to permit the application loading, will also be burdened. If an application is used for credit service, and if processing such as settings of user credit investigation and an allowable limit at the time of application is considered as an example, it is understood that both of the user and the service provider are burdened.

This problem is caused by processing procedures of application loading at the time of reissuance, which is the same as those of initial issuance. If the service provider can know that it is application reloading in the reissued card, and if the service provider can distinguish the processing procedures, it is possible to reduce the user's load at the time of reissuance. However, the smart card offers a high level of safety, which is a major advantage of the smart card. Because of it, it is not possible to adopt a simple method in which, for example, reloading application from the user is trusted.

Taking such a background into consideration, the present invention provides a safe method and a safe system for security, by which the service provider can recognize the smart card as a reissued card and can judge whether or not a requested application for loading was loaded in a prior smart card.

In order to solve the above-mentioned problem, the present invention basically uses two methods. Concerning the methods, some points will be briefly summarized as follows.

A first method of the present invention relates to a method by which the card issuer transfers an id for uniquely identifying a smart card, such as a "card id (identification)", and the like (that is to say, identification data of the smart card) to the service provider concerned when reissuing the smart card.

A second method of the present invention relates to a method for inquiring of the card issuer about card information if the service provider cannot read a card ID from a smart card directly, and when application reloading in the smart card is requested by a user.

Moreover, a third method of the present invention uses both of the first and the second methods, which relate to the present invention, in one smart card system. In this manner, the service provider can judge whether or not a smart card, of which loading is requested, is a reissued card.

The present invention provides a database or various smart card systems, which has a storage medium corresponding to the methods.

The first method relates to a method by which the card issuer transfers an ID for uniquely identifying a card, such as a card ID to the service provider concerned when reissuing the smart card. In this case, the service provider concerned is basically a service provider that has loaded an application in an old card.

If the card issuer notifies these service providers of, for example, information, in which the card ID of the old card is associated with the card ID of the reissued card, as reissuance information of the smart card, the service provider can recognize the following facts:

(1) The smart card, which is presented by the card user, is a reissued card.

(2) Information specific to the old smart card that has been previously used by the card user. That is to say, identification data of the smart card, for example, such as a smart card ID.

By knowing the card ID of the old card, it is possible to check whether or not the application of which loading is requested was loaded in the old card. In addition, if circumstances require, it is also possible to inquire a result of credit investigation of the user, and the like.

Therefore, if this method is used, a smart card system for issuing and managing a smart card comprises a storage medium, which can be read by a computer, as described below.

To be more specific, it is a storage media comprising:
a first data area in which identification data of a reissued smart card is stored; and
a second data area in which identification data of an old smart card corresponding to the reissued card is stored;

wherein:
the identification data of the reissued smart card and the identification data of the old smart card are associated with each other so that each of the identification data can be read using the other identification data.

Additionally, in like manner, a smart card system, which executes and manages services by loading an application in a smart card, comprises a storage medium, which can be read by a computer, as described below.

To be more specific, it is a storage media comprising:
a first data area in which identification data of a reissued smart card is stored; and
a second data area in which identification data of an old smart card corresponding to the reissued card is stored; and wherein:
the identification data of the reissued smart card and the identification data of the old smart card are associated with each other so that each of the identification data can be read using the other identification data.

However, this method is based on the presumption that the service provider can read a card ID for uniquely identifying the smart card directly from the smart card using an external terminal, or the like. That is because if the card ID cannot be read, or if the service provider cannot read directly the card ID that is encrypted using random numbers, collation of smart card reissuance information, which has been notified by the card issuer beforehand, becomes impossible.

The second method of the present invention is a method for solving the following problem: the service provider cannot read the card ID directly from the smart card. In this case, even if the smart card reissuance information is notified by the card issuer beforehand, the service provider will experience a situation in which, from the smart card, the service provider cannot read data to be inquired. Therefore, a method like the first method described above cannot be adopted.

Because of it, an inquiry about the card information is sent from the service provider to the card issuer. When an application reloading request is issued from the card user to the smart card, the service provider obtains information such as a card ID encrypted from the smart card, and information such as a number described in a card surface, and sends the card issuer an inquiry about ID information including an "application ID" for which loading is requested. As a matter of course, the card issuer can recognize a reissued card. The card issuer, therefore, sends a reply that indicates whether or not the smart card is a reissued card. In addition, if the smart card is a reissued card, the card issuer judges whether or not the above-mentioned application was loaded in a corresponding old card. Moreover, if the application was loaded, a "message ID" used when the old card is permitted to load he "message ID" is an ID that uniquely identifies an electronic message used when exchanging the electronic message between the card issuer and the service provider. As an example, there is a method for uniquely identifying the message ID that uses, for example, company identification data of the card issuer, company identification data of the service provider, and a sequence number of the message in combination. This message ID enables the service provider to recognize the facts described below. As a numbering method for the message ID that is unique, there is a method in which company identification data of the card issuer, company information on the service provider, and a sequential number are combined. This method permits an electronic message to be distinguished from the other electronic messages.

(1) The smart card, which is presented by the user, is a reissued card.
(2) Information used when the application has been loaded in the smart card previously used by the user.

In this case, the reason why the message ID is given are the following: because a card ID cannot be read directly from the smart card, the service provider cannot recognize it even if the old card id is notified; and the card issuer may have a policy that prohibits notification of a card ID to outside. If the message ID, which was used when application loading in the old card has been permitted, is used, both of the card issuer and the service provider can recognize it. In addition, the service provider can trace related information including an examination result at that time.

Determining which method should be taken as a solution, that is, the first method or the second method depends on characteristics of a smart card used by a system. To be more specific, if companies other than the card issuer are permitted to read a card ID of a smart card, the first method of the present invention can be used as a solution. On the other hand, if reading a card ID is not permitted, the second method of the present invention can be used as a solution.

Moreover, when two or more kinds of smart cards are handled in one system, the third method, which is realized using the first and the second methods in combination, can be used as a solution. In this case, identification data, which is called platform type data representing a kind of a smart card, is included in communication data exchanged between the card issuer and the service provider. A method to be selected, that is, the first method or the second method, is determined by referring to the platform type data on the receiving side.

According to this second method, a smart card system for issuing and managing a smart card comprises a storage medium, which can be read by a computer, as described below.

To be more specific, it is a storage medium comprising:
a first data area in which identification data of a reissued smart card is stored; and
a second data area for storing identification data that was used when an application in an old smart card corresponding to the reissued smart card has been loaded, and that uniquely identifies an electronic message exchanged with a service provider;

wherein:
the identification data, which uniquely identifies the electronic message exchanged with the service provider, can be read according to the identification data of the reissued smart card.

Additionally, in like manner, a smart card system, which executes and manages services by loading the application in the smart card, comprises a database, which can be read by a computer, as described below.

To be more specific, it is a storage medium comprising at least:
a data area for storing identification data that was used when a requested application in an old smart card corresponding to the reissued smart card has been loaded, and that uniquely identifies an electronic message exchanged with a card issuer; and
a data area for storing information related to application loading used when the application has been loaded in the old smart card;

wherein:
the information related to application loading, which was used when the application has been loaded in the old smart card, can be read according to third identification data that uniquely identifies the electronic message exchanged between the card issuer and the service provider.

BRIEF DESCRIPTION OF THE DRAWINGS

FIG. 12 is a diagram illustrating an example of a communication data structure.

FIG. 13 is a diagram illustrating an example of a data table in a database.

FIG. 14 is a diagram illustrating an example of a data table in a database.

FIG. 15 is a diagram illustrating an example of a communication data structure.

FIG. 16 is a diagram illustrating an example of a data table in a database.

FIG. 17 is a diagram illustrating an example of a data table in a database.

DESCRIPTION OF THE PREFERRED EMBODIMENTS

Figure 1:
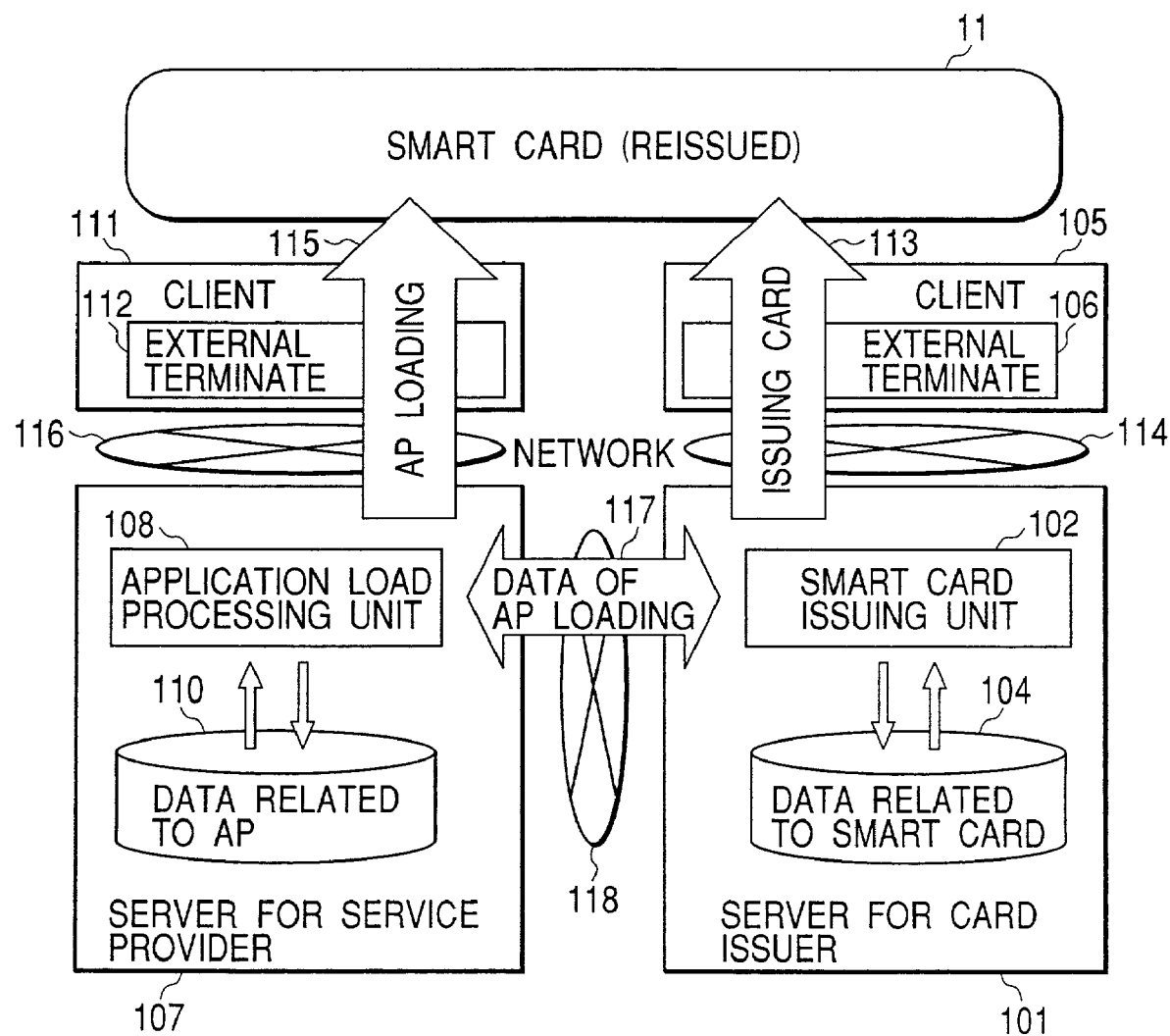
FIG. 1 is a basic configuration diagram illustrating a system.

Next, the present invention will be described more specifically. A basic configuration of a system according to the present invention is shown in FIG. 1. FIG. 1 schematically shows an interrelationship among a smart card issuer, a service provider for a smart card, clients, and the smart card.

The "smart card issuer" is an enterprising body that performs issuance and management of the smart card using a smart card issuance/management system (101). The "smart card issuer" is also an enterprising body that has responsibilities relating to the smart card. The card issuer holds smart card related data in a database related to smart card (104), and issues a smart card according to the data to distribute the smart card to a user. The smart card related data contains application information from the user, and basic information required for issuance of the card.

The smart card issuer has a smart card issuance/management system (101) that comprises at least a database for managing smart card (104), and a processing unit for issuing/managing smart card (102). This database for managing smart cart (104) and this processing unit for issuing/managing smart card (102) are operated by an ordinary computer system. That is to say, for example, reading of data, collation, and judgment of propriety are performed. As a matter of course, said system has a receiving means, and a transmitting means. They are also those of the general online system. It should be noted that concerning a method of configuration, operation, and the like, a smart card system on the service provider side is also basically the same as that on the card issuer side.

A terminal unit (106) is connected to this smart card issuance/management system (101) through a network (114). Generally, a plurality of terminal units (106), which are intended to serve a client (105), are connected to the smart card issuance/management system (101). In this sense, the terminal unit is commonly called external terminal. There may be the following case: a case where a client inputs given items from this external terminal by himself/herself; or a case where the given items are inputted on the card issuer side.

On the other hand, the "service provider" is an enterprising body that performs issuance and management of an application loaded on the smart card using a smart card service providing/managing system (107). The service provider makes or obtains an application to be loaded on a smart card, and then loads the application on the smart card. Application data is stored in a smart card application management database (110).

The smart card service provider has the smart card service providing/managing system (107) that comprises at least the smart card application management database (110) and a smart card application processing unit (108). A terminal unit (112) is connected to this smart card service providing/managing system (107) through a network (116). Generally, a plurality of terminal units (112), which are intended to serve a client (111), are connected to the smart card service providing/managing system (107). In this sense, the terminal unit is commonly called external terminal. There may be the following case: a case where a client inputs given items from this external terminal by himself/herself; or a case where the given items are inputted on the card issuer side.

The card issuer registers required information in a smart card (11) at the time of its issuance via the external terminal (106) connected to the client (105). The service provider loads the application on the smart card via an external terminal (111) connected to a client (110). In addition, permission for loading the application required in this case is obtained by information exchange with the card issuer system. Connection between the card issuer system and the service provider system, and connection among clients and servers, are basically provided through networks (114, 116, 118). Information exchange is achieved by transmitting and receiving online electronic messages. However, according to a policy of the managing entity, it is also possible to realize the information exchange by sending an information storage medium such as a floppy disk by mail, or by sending a document by mail.

According to the present invention, each of processing units (102, 109), which corresponds to the card issuer's smart card system (101) and the service provider's smart card system (107) respectively, comprises a function of notifying AP (Application) reloading, and a function of inquiring card reissuance, which will be described later. Each of the functions is performed by a computer program.

Figure 3:
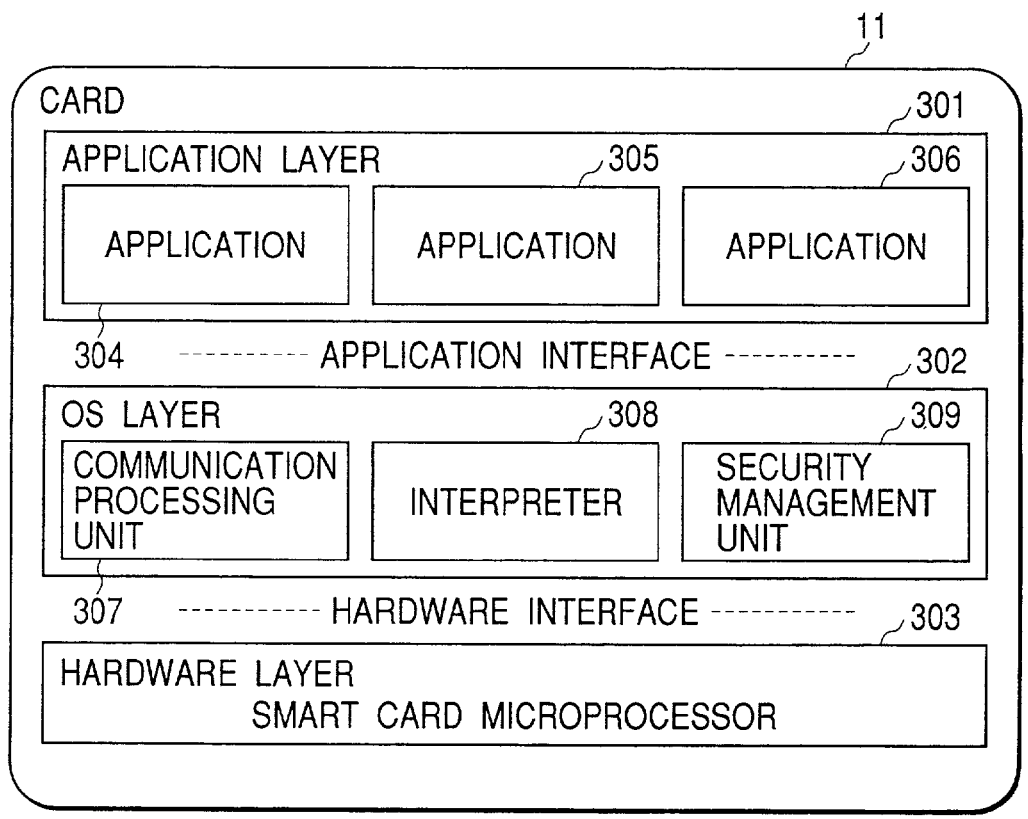
FIG. 3 is a diagram illustrating a basic configuration of a smart card.

FIG. 3 shows a logical configuration of a basic area in an IC, which is loaded in such a smart card (11). As is the case with general microcomputers, the IC comprises: a hardware layer (303); an OS layer (302), that is, an area where OS is loaded; an application layer (301), that is, an area where an application is loaded. In this case, "multiple application loadable" means that a plurality of applications (304 through 306) can be loaded in the application layer (301). In addition, "dynamic loadable" means that the applications (304 through 306) can be loaded or unloaded after issuance of a card. The OS layer (302) receives a command from an external terminal, transfers the command to an application, and performs others. As a matter of course, an application interface is provided between the application layer (301) and the OS layer (302). A hardware interface is provided between the OS layer (302) and the hardware layer (303).

Next, a specific method for reloading an application according to the present invention will be described.

A general system can be used sufficiently as a system that includes hardware devices such as a terminal unit used for a smart card. Each company concerned with the present invention has an external terminal such as a server and a reader writer. There may be various kinds of methods for holding information: information is temporarily held in this server; information is loaded in a smart card via a reader writer; and the like. The present invention does not relate directly to such operation methods. As a matter of course, the present invention is applicable to all of the cases.

Figure 2:
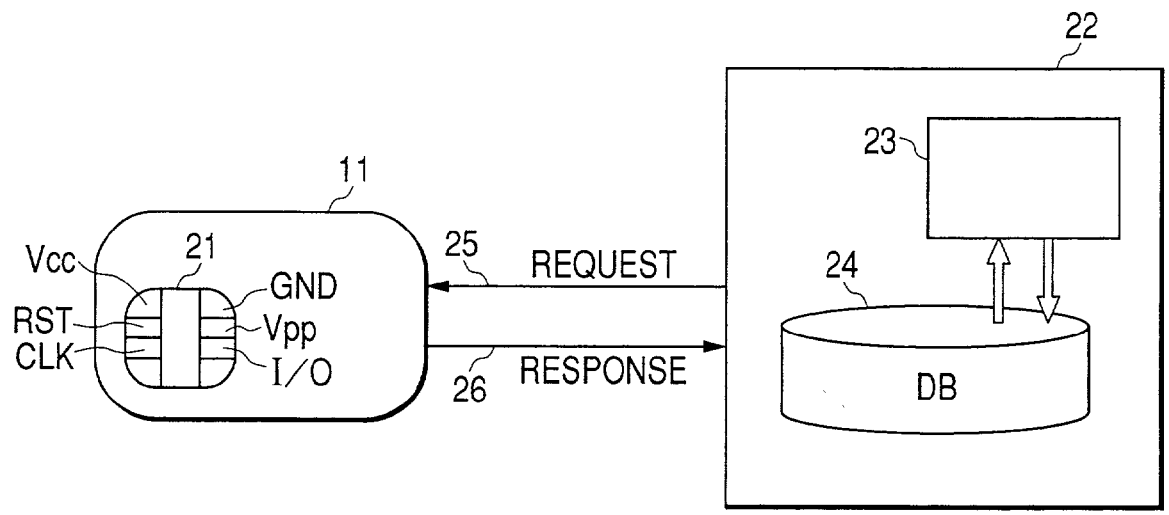
FIG. 2 is a diagram illustrating an outline of a card system.

FIG. 2 is a diagram illustrating an outline of an example of a card system. The example shows that there is a chip 21 in a smart card 11, and that the chip 21 exchanges data with a reader writer 22. In the reader writer, there are the following: a control processor 23; a magnetic disk 24 used as a database; and the like. In the smart card 11, as generally shown, terminals such as, for example, Vcc (power supply), GND (ground), RST (reset), I/O (input/output), and CLK (clock) are illustrated. In addition, reference number 25 represents various kinds of inquiries from the reader writer 22 to the smart card 11, for example, inquiries such as a card ID. A reference number 26 represents a reply that is given by the smart card for the inquiry described above. A general system can be used sufficiently for communication of such various kinds of information.

In this connection, to be more specific, the above-mentioned application is loaded in a memory area of the IC chip in the smart card. Generally speaking, RAM (Random Access Memory), Flash Memory, FRAM (Ferromagnetic Random Access Memory), EEPROM (Electrical Erasable Programmable Read Only Memory), ROM (Read Only Memory), or the like, are used as a memory. Moreover, general OS, and the like, can also be used sufficiently. As regards a signal processing system in the IC chip, a signal processing system used in the general smart card is sufficient.

Figure 4:
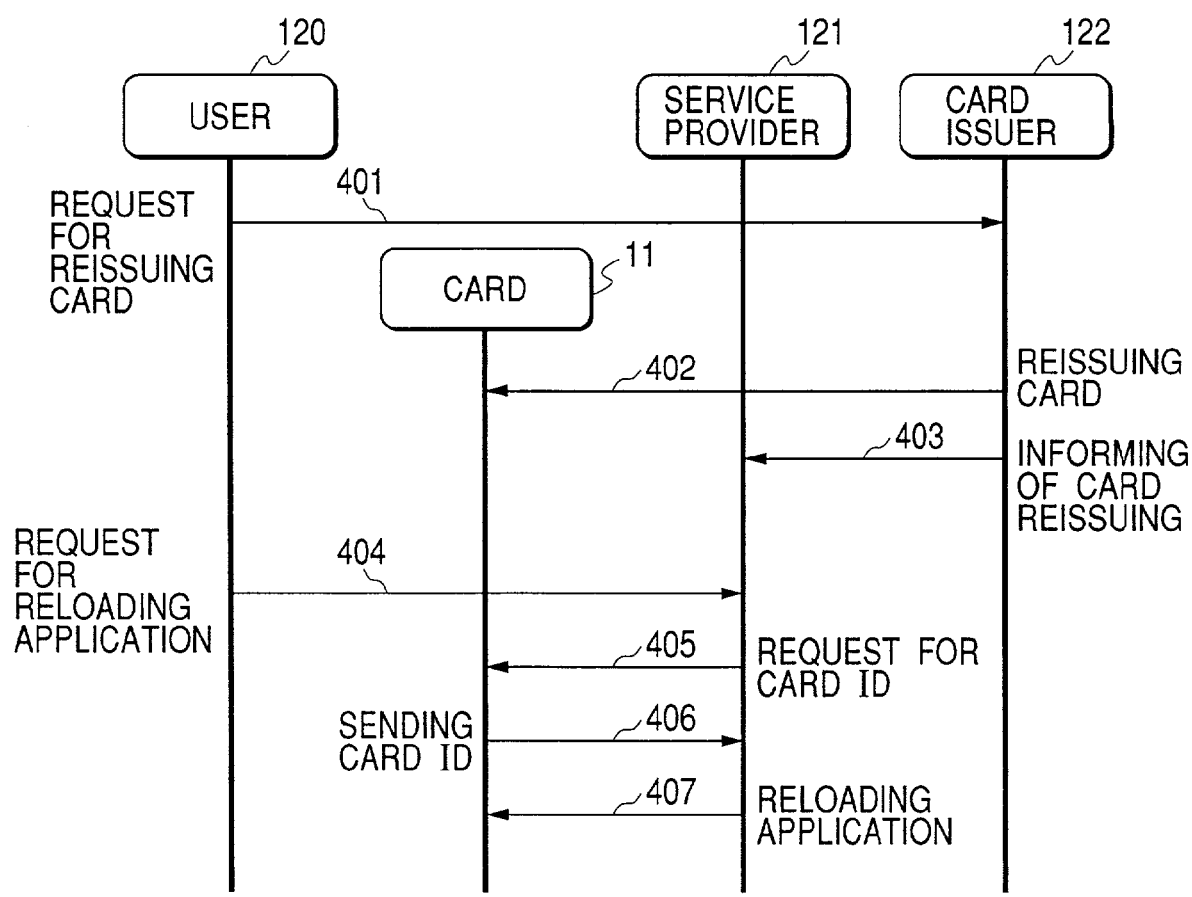
FIG. 4 is a diagram illustrating a sequence of application reloading, which is used when third parties other than a card issuer can read a card ID, according to the present invention.

As described above, the present invention uses two methods for solving the problems. To begin with, concerning the first method, its sequence will be described with reference to FIG. 4. The sequence shown in FIG. 4 is used on the assumption that a card issuer (122) and a service provider (121) have already completed exchanges required for service operation; in this case, the exchanges include the following: partnership based on an agreement of contract conditions, and the like; application information registration from the service provider (121) to the card issuer (122); and the like.

In addition, in the first method of the present invention, it is possible for a third party other than the card issuer to read the card ID of the smart card (11) directly. In this case, a typical example of the third party other than the card issuer is, for example, a service provider.

Steps for card reissuing processing, and steps for application reloading processing that is associated with the card reissuing processing, will be described as below. In the first place, a card user (120) requests an issuer (122) of a smart card, for which reissuance is desired, to reissue a card (step 401). To be more specific, the request for reissuance of this card is issued by a given input to a processing unit for the smart card issuance management processing. This input may be done by the card user (120) himself/herself, or by an operator, etc. instructed by the card user (120).

The card issuer performs judgment processing (that is to say, examination relating to reissuance) according to an operation policy of the card issuer. If this examination is passed, the card issuer issues a reissued card (11). This examination relating to reissuance is an examination including items relating to general card issuance, such as, for example, name, age, occupation, income, etc. Actual items to be examined depend on an operation policy of the card issuer. As a matter of course, the examination, the judgment, and check processing are performed by the processing unit of the system.

Next, a card issuer notifies the service provider of an application, which is loaded in an old card, of smart card reissuance information (step 403).

More specifically, the "smart card reissuance information" is a list that associates a card ID of the old card with a card ID of the reissued card. FIG. 12 shows an example of communication data transmitted and received in a step 403. To be more specific, the communication data is read from, for example, an inventor's database, and is then transmitted. The example of the communication data includes a header, PF (Platform) type data, information on the old card ID, information on the reissued card ID, and the like. By the way, in this case, the PF type data is information for giving an instruction which method should be taken, that is, the first method or the second method, according to the present invention. As a specific example, information such as <100, 200, and 999> is used. For example, <100> indicates the first processing method; <200> indicates the second processing method; and moreover, <999> indicates that a processing method is unknown. Of course, the specific signal example illustrated here is merely one example. Because of it, a system builder can use a desired data configuration. In this manner, the communication data includes pair structured data of the old card ID and the reissued card ID. Furthermore, if the card issuer notifies the service provider of the smart card reissuance information, information, which associates the old card with the reissued card, is stored in both of the card issuer database and the service provider database as shown in FIG. 13. The information, which associates the old card ID with the reissued card ID, is important for the present invention. After the above-mentioned processing, the processing relating to the reissuance of the smart card ends.

Next, processing performed when the card user (120) reloads the application, which was loaded in the old card, in the reissued card will be described.

The card user (120) prepares the reissued card (11), and requests the service provider (121) to reload the application (step 404). To be more specific, the request for reloading of this application is issued by a given input to a processing unit for the smart card application issuance management processing. More specifically, the request for reloading of this application is issued by a given input to a processing unit for the smart card issuance management processing. This input may be done by the card user (120) himself/herself, or by an operator, etc. instructed by the card user (120).

The service provider requests the reissued card to give a card ID (step 405). This processing realizes the first method of the present invention. Therefore, the step 405 is an appropriate request because it is based on the assumption that third parties other than the card issuer can read the card ID directly from the smart card.

The reissued card notifies the service provider of the card ID of the reissued card (step 406). Generally, such an action is performed by a online system.

The service provider collates a card ID, which has been read from the smart card, in the smart card reissuance information notified beforehand in the step 403. More specifically, as described above, the "smart card reissuance information" is a list that associates a card ID of the old card with a card ID of the reissued card. FIG. 12 shows this example. If the card is a reissued card, an ID of the reissued card exists in the smart card reissuance information. According to the data in which both IDs correspond to each other, a card ID of the corresponding old card can be checked. The service provider reads information on the old card from a database, or the like, of the service provider using the card ID of this old card as a key. According to this search result, the service provider checks whether or not the application, of which reloading is requested by the user, was loaded in the old card. In addition, the examination result obtained when loading the application in the old card is utilized. Information required for application reloading, such as account information in a case where loading is charged, is inquired and used for reloading. Thus, if the application is judged to be reloadable, the service provider reloads the application in the reissued card (step 407).

Figure 19:
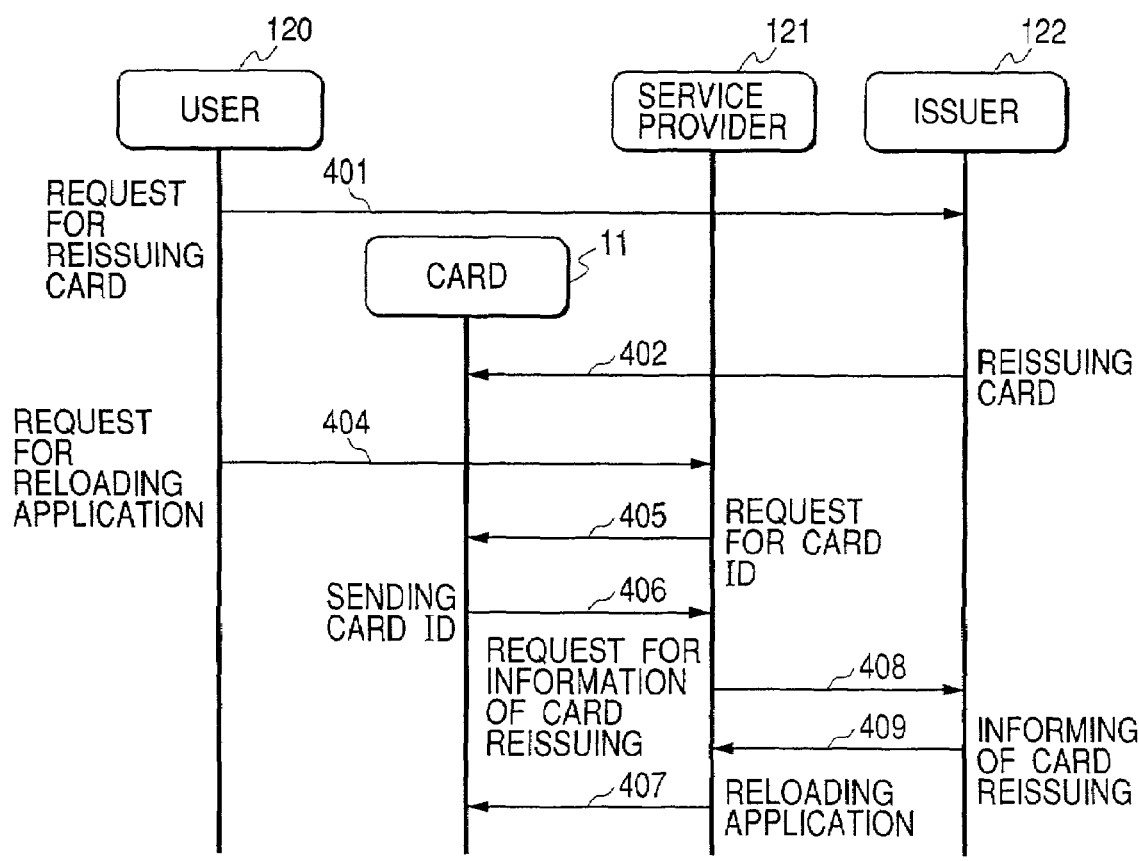
FIG. 19 is a diagram illustrating a sequence of application reloading, which is used when third parties other than a card issuer can read a card id, according to the present invention.

In addition, as an embodiment of this method, an irregular example as shown in FIG. 19 can also be considered. A difference from FIG. 4 is that a step 408 and a step 409 are added instead of the step 403. In other words, in the method shown in FIG. 4, the service provider notified the card issuer concerned of smart card reissuance information beforehand. And the service provider collated the old card ID with the reissued card ID in own system.

On the other hand, in the method of FIG. 19, when the user requests the service provider to reload the application, the service provider transmits the reissued card ID to the card issuer, and requests the card reissuance information. Because of it, timing in transmitting the smart card reissuance information is different.

However, in both of the embodiments, data having a structure, which includes the old card ID and the reissued card ID as a pair, is given from the card issuer to the service provider as smart card reissuance information. Both of the embodiments are the same on this point.

FIG. 14 shows an example of data related to the smart card, which is stored in the database by both of the card issuer and the service provider. The example of the data is stored using a card ID as a key, and includes user information, and information relating to a loaded application (for example, a loaded application ID, etc.). Moreover, the data includes information of examination that is performed according to a company's policy when loading the application. If loading of the application is charged, its accounting information, and the like, is also included. It is to be noted that, as a matter of course, a real system may includes additional information, and various kinds of information, of which configuration is different from that of information illustrate in this example.

Figure 5:
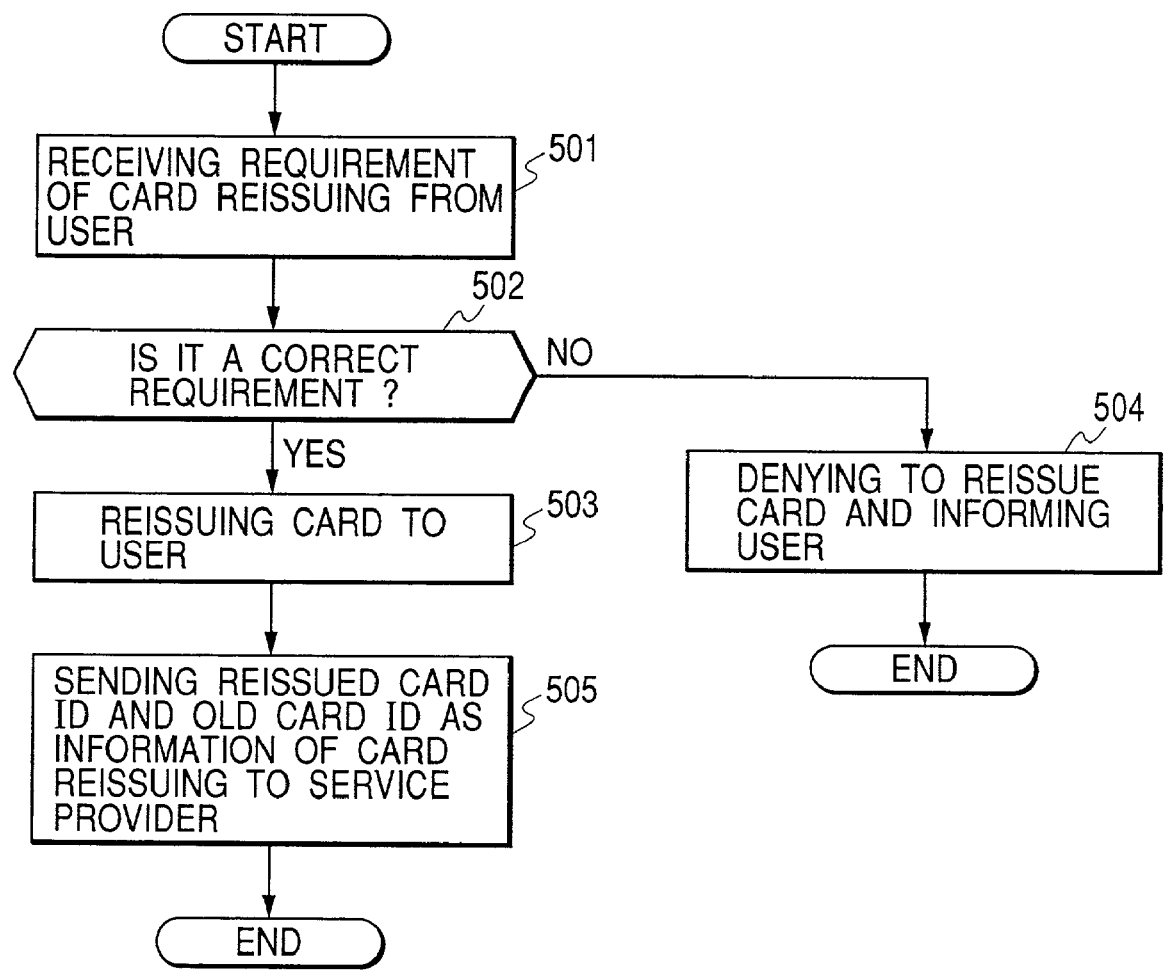
FIG. 5 is a diagram illustrating a sequence of smart card reissuance by a card issuer according to the present invention.
Figure 6:
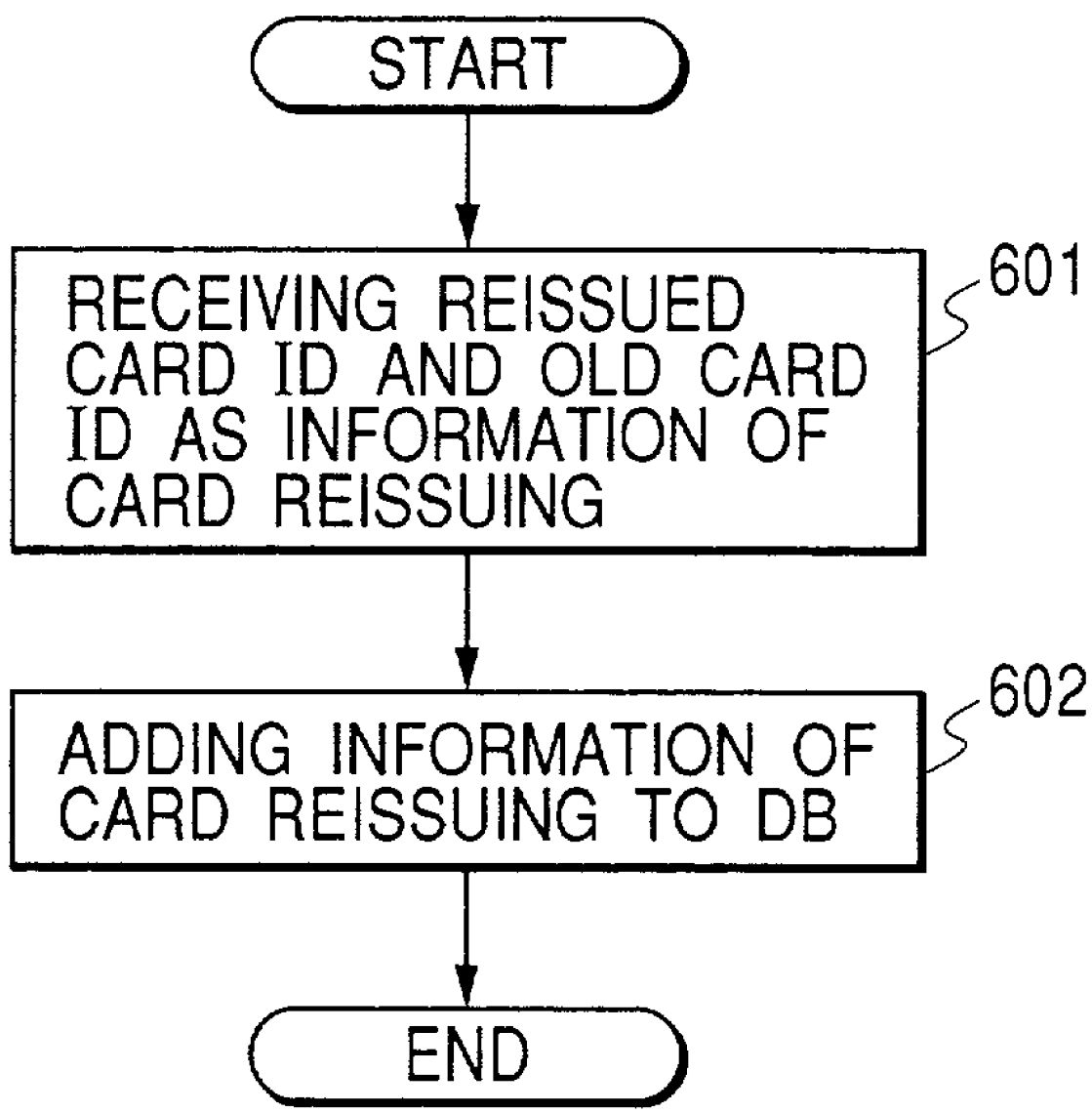
FIG. 6 is a sequence diagram according to the present invention illustrating that a service provider receives smart card reissuance information.
Figure 7:
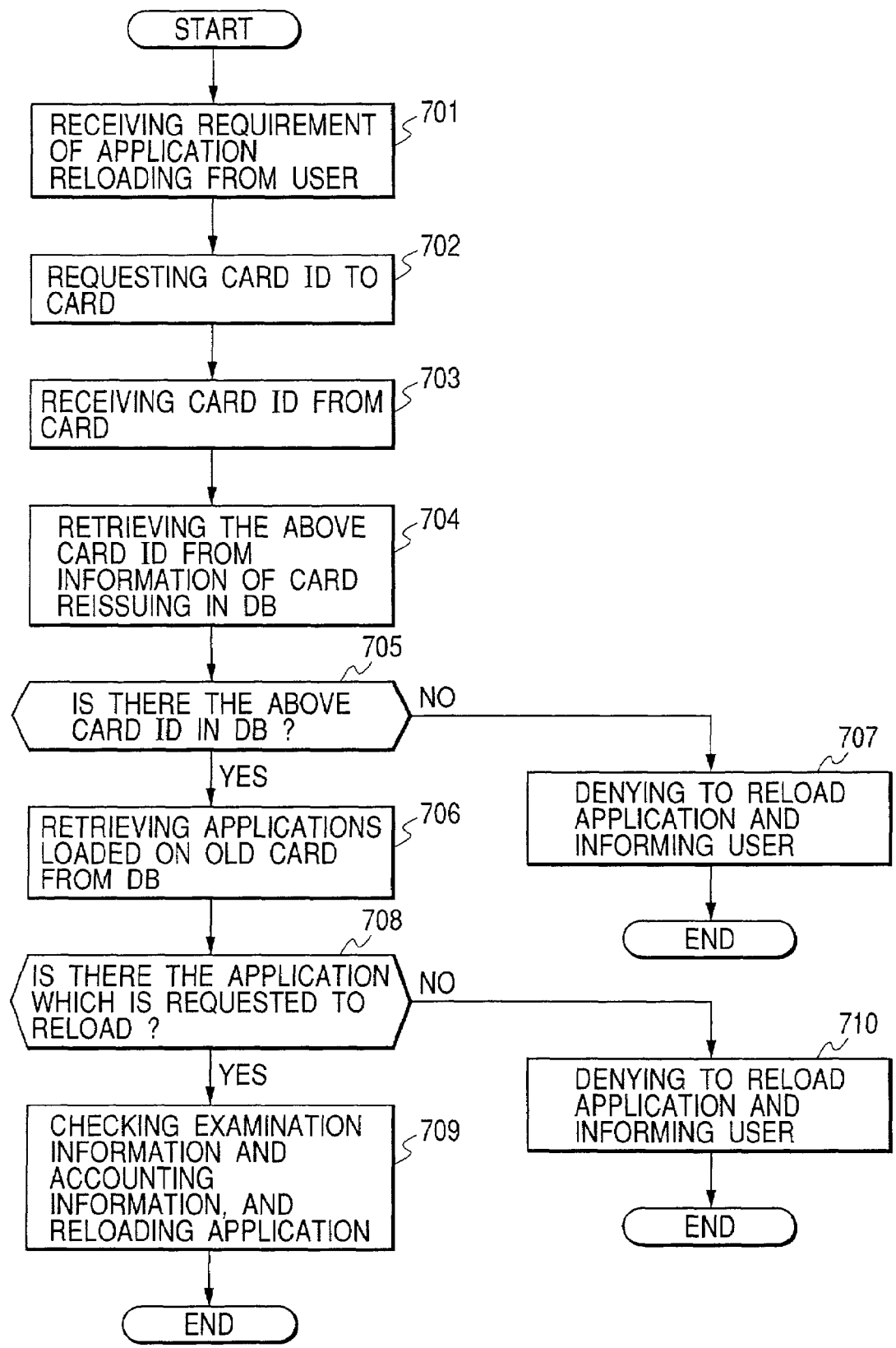
FIG. 7 is a sequence diagram according to the present invention illustrating that a service provider reloads an application in a reissued card.

In the next place, the first method according to the present invention described above will be detailed using operation flowcharts for each player of the card issuer and the service provider (FIGS. 5 through 7). The operation flowcharts detail the sequence shown in FIG. 4.

FIG. 5 is a flowchart illustrating operation in the "card issuer", which performs the processing of the first method according to the present invention. The card issuer receives a card reissuance request from the card user (step 501). The card issuer examines the card reissuance request according to own operation policy (step 502). If reissuance is not permitted as a result of examination, the card issuer cancels the card reissuance processing, and notifies the user of it (step 504). If the reissuance is permitted as a result of the examination, the card issuer reissues a smart card to the user (step 503). Additionally, if the application is loaded in the old card, the card issuer notifies the service provider concerned of the smart card reissuing information, and then ends the smart card reissuance processing (step 505).

FIG. 6 is a flowchart illustrating operation of the "service provider" in the smart card reissuance processing in like manner. The service provider receives smart card reissuance information from the card issuer (step 601). The service provider stores the received smart card reissuance information in the smart card application management database to manage the same (step 602).

FIG. 7 is a flowchart illustrating operation of the "service provider" in a case where application reloading processing is performed for the reissued card in response to a request from the user. The service provider receives an application reloading request from the user (step 701). The service provider requests the smart card to notify a card ID (step 702). The card ID is received from the smart card (step 703).

As show in the step 601 in FIG. 6, the card ID is received from the card issuer. The card id of the reissued card is searched in the smart card reissuance information, which is stored in the smart card application management database (step 704).

If the card ID does not exist in the database, it is possible to conclude that the card is not a reissued card, or that the service provider has not loaded the application in the old card. Therefore, the application reloading processing is cancelled, and the user is notified of it (step 707). If the card ID exists in the smart card application management database, the service provider searches card information on the old card in the smart card application management database using a card ID of the corresponding old card as a key (step 706).

If the application, for which a reloading request is issued, was not loaded in the old card, the application reloading processing is cancelled because loading of the application is treated as new loading. After that, the user is notified of it (step 710). If the application, for which a reloading request is issued, was loaded in the old card successfully, examination information on loading of the application in the old card is judged. In addition, if there is a charge, accounting information, and the like, is referred to. If the application is judged to be reloadable, the application is reloaded in the smart card, and the processing ends (step 709).

Next, a sequence of the second method according to the present invention will be described with reference to FIG. 8. The second method is a method for realizing application reloading processing for a smart card type, which does not permit third parties other than a card issuer to read a card ID directly. A reason why the third parties are not permitted to read the card ID directly is thought that the card issuer has a policy to prevent people outside from knowing the card ID for security reasons.

Figure 8:
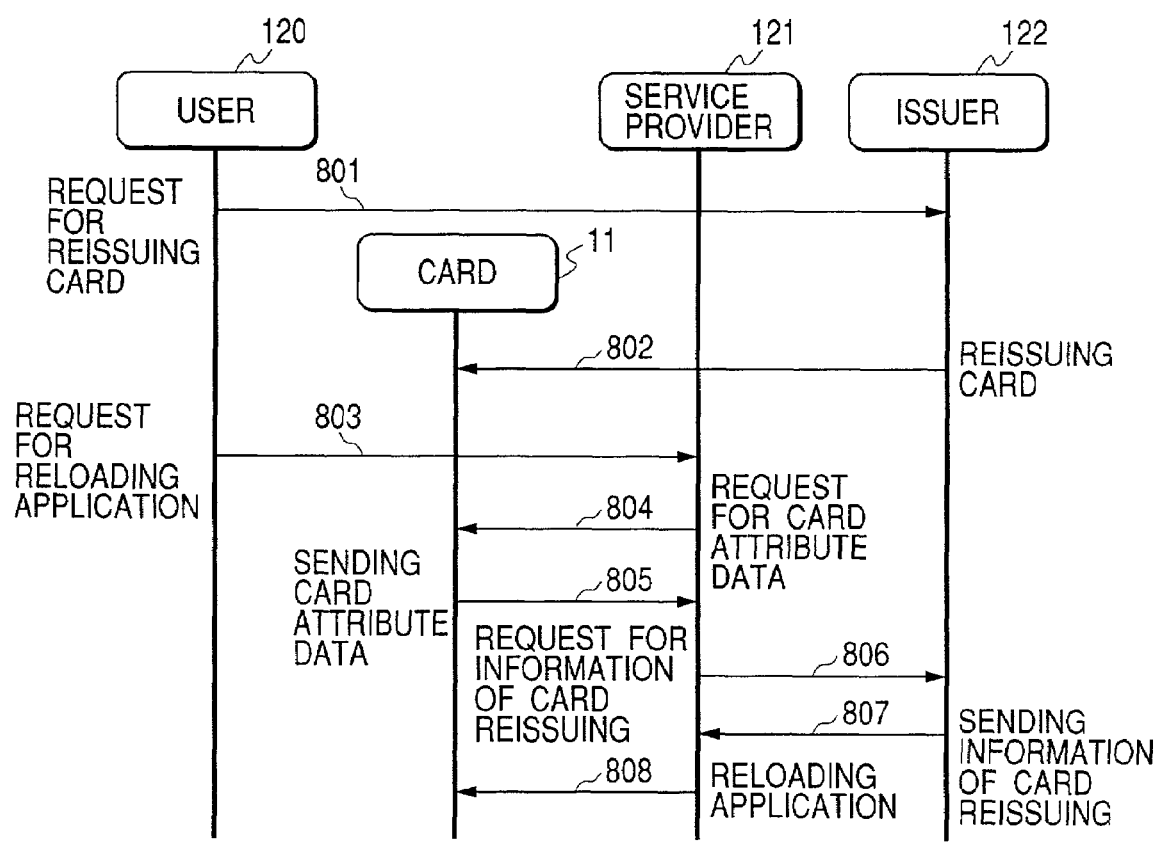
FIG. 8 is a diagram illustrating a sequence of application reloading, which is used when third parties other than a card issuer cannot read a card ID, according to the present invention.via a reader writer; and the like. The present invention does not relate directly to such operation methods. As a matter of course, the present invention is applicable to all of the cases.

In FIG. 8, the second method is based on the assumption that a card issuer (122) and a service provider (121) have already completed exchanges required for service operation; in this case, the exchanges include the following: partnership based on an agreement of contract conditions, and the like; application information registration from the service provider (121) to the card issuer (122); and the like.

Application is reloaded on the assumption that this application was loaded in the old card. When loading the application in the old card, the card issuer and the service provider exchange permission for loading, and share identification data of an electronic message for the permission (that is, an ID).

Steps for card reissuing processing, and steps for application reloading processing that is associated with the card reissuing processing, will be described as below. In the first place, a card user (120) requests an issuer (122) of a smart card, for which reissuance is desired, to reissue a card (step 801). The card issuer performs examination relating to reissuance according to an operation policy of the card issuer. If this examination is passed, the card issuer issues a reissued card (11).

In contrast to the first method of the present invention, the card issuer does not notify the service provider of smart card reissuance information in this method. That is because even if a list relating to the card ID of the smart card is notified, the service provider cannot read the card ID from the smart card. Therefore, collation becomes impossible. All of the processing relating to card reissuance is described above.

Next, processing performed when the user reloads the application, which is loaded in the old card, in the reissued card in like manner will be described. The card user (120) prepares the reissued card (11), and requests the service provider (121) to reload the application (step 803). To be more specific, the request for reloading this application in this card is issued by a given input to a processing unit for the application issuance management processing. This input may be done by the card user (120) himself/herself, or by an operator, etc. instructed by the card user (120).

The service provider requests the reissued card to give card attribute data (step 804). The processing realizes the second method of the present invention. The card outputs the attribute data such as the card ID to outside in the form that can be identified only by the card issuer. In this case, the "card attribute data" is information that identifies the smart card. In other words, the card attribute data is data that is loaded in the smart card, and that permits this smart card to be distinguished from other smart cards. As an example, there may be a method in which the card ID is encrypted using a public key of the card issuer. As another example, there is a card ID that is encrypted by the card issuer using the card issuer's own public key. The encrypted card ID is loaded in the smart card by the card issuer in card issuance processing. As a matter of course, it is needless to say that other encrypting methods can also be used. The reissued card notifies the service provider of the card, attribute data that can be decrypted only by the card issuer as described above (step 805). Generally, such data is notified by an online system.

The service provider transmits the card attribute data, and the application ID for which reloading request is issued, to the card issuer, and requests for inquiry about card information (step 806). Although the service provider cannot decrypt the card attribute data, the card attribute data can be decrypted by the card issuer. Therefore, the card issuer reads information on the old card corresponding to the reissued card from the smart card management database using the card attribute data, which has been sent, as a key. The message ID which is used when permission for loading has been exchanged between the card issuer and the service provider, is also searched; the permission for loading is required to load the transmitted application in the old card in like manner (the "message ID is an electronic message ID exchanged between the card issuer and the service provider, and permits an electronic message to be distinguished from other electronic messages uniquely). The card issuer transmits the following to the service provider (step 807): information on whether or not a card for which inquiry is requested is a reissued card; and if it is the reissued card, a message ID used when the permission for loading the application, for which reloading is requested, in the old card has been exchanged.

FIG. 15 shows an example of communication data transmitted and received in a step 807. The communication data includes, for example, a header, a PF type, capability to reissue OK/NG, and a message ID and the like. In this case, the header and the PF type are the same as those described above. In this manner, the communication data includes "capability to reissue OK/NG" information; to be more specific, the message ID and information on whether or not it is a reissued card. According to the received information, the service provider checks the following: whether or not the smart card is a reissued card; and whether or not the application, for which reloading is requested, was loaded in the old card.

In addition, as a result of notifying the smart card reissuance information, as shown in FIG. 16, in both of the card issuer database and the service provider database, the capability to reissue OK/NG is stored; more specifically, the information on whether or not it is a reissued card is stored, and in addition to it, if it is the reissued card, the message ID associated with the reissued card is stored. Moreover, they can read the data mutually. In addition, the service provider can obtain information at the time of loading in the old card, such as an examination result, by searching the smart card application management database using the message ID, which is used when the permission for loading in the old card has been exchanged, as a key. The processing described above enables the service provider to check whether or not the application, of which reloading is requested by the user, was loaded in the old card. In addition, the service provider can inquire information required for application reloading, such as an examination result at the time of loading, to judge whether or not the application is reloadable. If it is judged to be reloadable, the card issuer reloads the application in the reissued card (step 808).

FIG. 17 shows an example of data related to the smart card, which is stored in the database by both of the card issuer and the service provider. The example of the data is stored using a message ID as a key, and includes user information, and information relating to a loaded application, such as a loaded application ID. Moreover, the data includes information of examination that is performed according to a company's policy when loading the application. If loading of the application is charged, its accounting information, and the like, is also included. As a matter of course, other information may also be held arbitrarily as desired.

Figure 9:
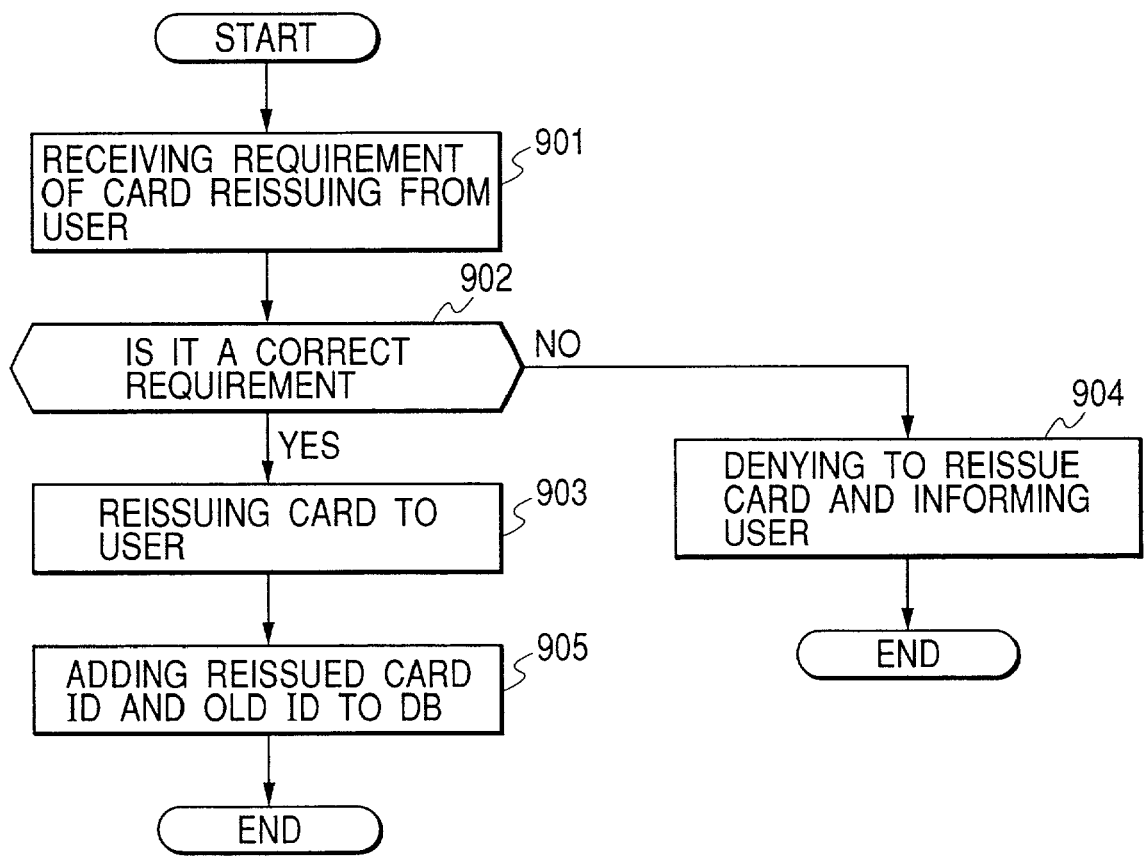
FIG. 9 is a diagram illustrating a sequence of smart card reissuance by a card issuer according to the present invention.
Figure 10:
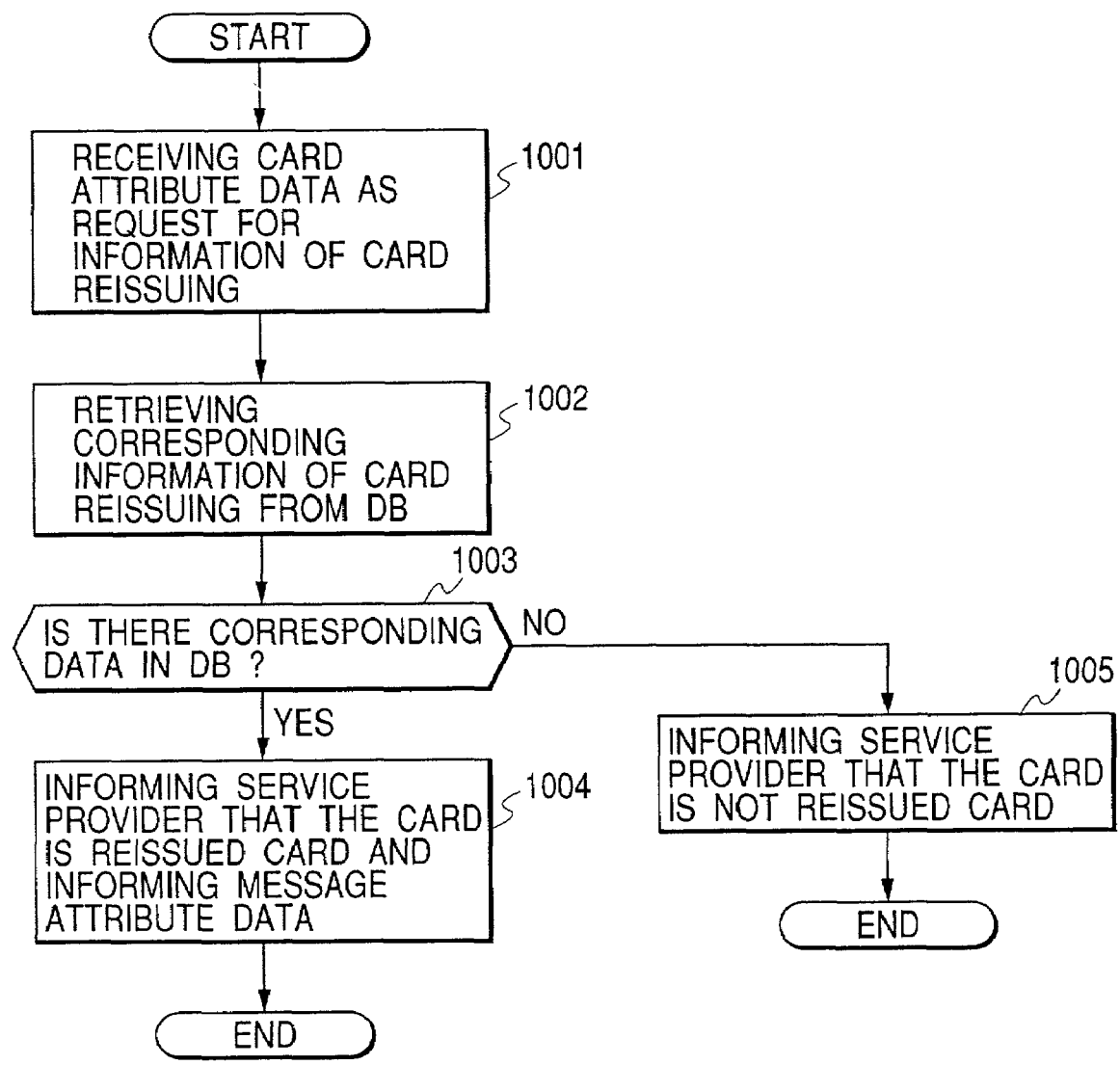
FIG. 10 is a sequence diagram according to the present invention illustrating that a card issuer receives a card information inquiry request for a reissued card.
Figure 11:
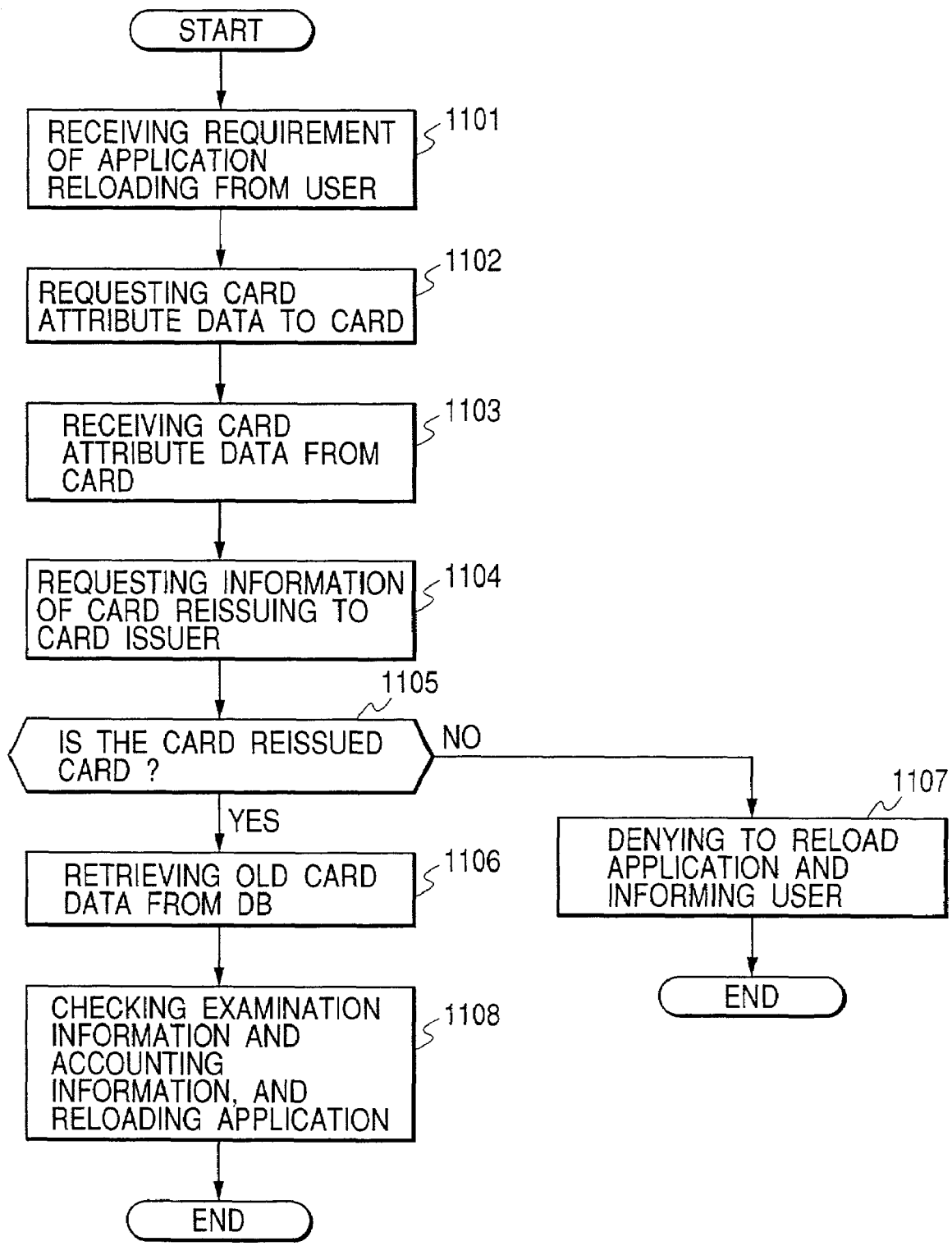
FIG. 11 is a sequence diagram according to the present invention illustrating that a service provider reloads an application in a reissued card.

Next, details of the second method according to the present invention described above will be detailed using operation flowcharts for each player of the card issuer and the service provider (FIGS. 9 through 11). The operation flowcharts detail the sequence shown in FIG. 8.

FIG. 9 is a flowchart illustrating operation in the "card issuer", which performs the processing of the second method according to the present invention. The "card issuer" receives a card reissuance request from the card user (step 901). The card issuer examines the card reissuance request according to the card issuer's own operation policy (step 902). If reissuance is not permitted as a result of examination, the card issuer cancels the card reissuance processing, and notifies the user of it (step 904). If the reissuance is permitted as a result of the examination, the card issuer reissues a smart card to the user (step 903). After that, the card issuer stores the smart card reissuance information in the smart card management database, etc., and ends the smart card reissuance processing (step 905). More specifically, the smart card reissuance information is a list that associates a card ID of the old card with a card ID of the reissued card.

FIG. 10 is a flowchart relating to the "card issuer", in which processing for a card information inquiry request issued by the service provider for a reissued card is shown. The card issuer receives the card information inquiry request for the reissued card from the service provider (step 1001).

The card information inquiry request includes card attribute data, which has been read from the smart card by the service provider, and an application ID of which reloading is requested. Because the card attribute data is usually encrypted, or is processed by another method, only the card issuer can decrypt the data. Therefore, the card attribute data is decrypted, and using the decrypted data as a key, the smart card management database is searched (step 1002). The service provider is notified that the smart card is not a reissued card, in the following case: if information corresponding to the card attribute data does not exist in the smart card management database; or if a corresponding smart card is an initially issued card that is normal; or if it is a reissued card, but if the application which corresponds to the application ID received in the step 1001 is not loaded in a corresponding old card. After the notification, the processing ends (step 1005). If the information corresponding to the card attribute data exists in the smart card management database, the message ID, which is used when the application having the application ID received in the step 1001 has been loaded in the corresponding old card, is searched. Then, information indicating that the card is a reissued card, and the message ID used when the application of which reloading is requested has been loaded in the old card, are transmitted to the service provider before the processing ends (step 1004).

FIG. 11 is a flowchart illustrating operation of the "service provider" when reloading an application in a reissued card in like manner. The service provider receives an application reloading request from the user (step 1101). The service provider requests the smart card to transmit card attribute data (step 1102). The card attribute data is received from a smart card (step 1103). A card information inquiry request relating to the reissued card is sent to the card issuer (step 1104). The request includes the card attribute data, and an ID of an application for which the reloading request is issued.

A result of the card information inquiry is received from the card issuer (step 1105). As a result of the inquiry, if the smart card is not a reissued card, the processing of reloading the application in the smart card is cancelled, and then the user is notified of it (step 1107). As a result of the inquiry, if the smart card is a reissued card, loading permission has already been exchanged when reloading the application, for which the reloading request was issued, in a corresponding old card. Because the exchanged message has already been received from the card issuer, the smart card application management database is searched using the message ID as a key (step 1106). Then, the examination result obtained when the application has been loaded in the old card is referred to. In addition, if there is a charge, accounting information is also referred to. If the application, for which a reloading request is issued, was loaded in the old card successfully, examination information on loading of the application in the old card is judged. In addition, if there is a charge, accounting information, and the like, is referred to. If the application is judged to be reloadable, the application is reloaded in the smart card, and the processing ends (step 1108).

Selection of which method should be used (that is, the first method or the second method of the present invention) depends on a card handled by the system. To be more specific, if a card ID of the smart card can be read by third parties other than the card issuer, the first method may be used. If it is possible to read the card attribute data that can be decrypted only by the card issuer, the second method may be used. In addition, if the system handles two or more kinds of smart cards, and if the system handles both of a smart card type using the first method and a smart card type using the second method, this problem can be solved by including platform type data, which indicates the kinds of the smart cards, in communication data exchanged between the card issuer and the service provider. FIGS. 12 and 15 illustrate examples of the communication data that include the platform type data. The company, which receives the communication data, judges which processing should be performed (that is, the processing by the first method or the processing by the second method) by referring to the platform type data.

Figure 18:
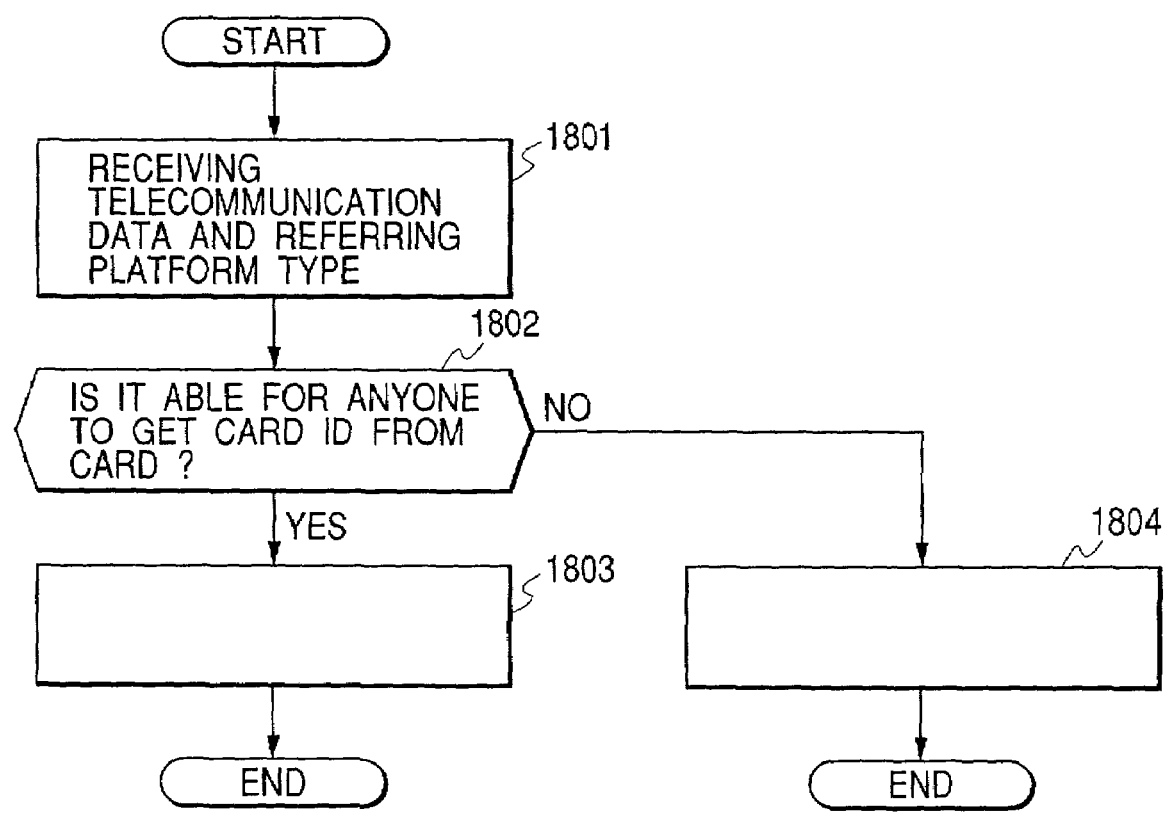
FIG. 18 is a sequence diagram according to the present invention illustrating that appropriate processing is selected in a case where two or more kinds of smart cards are handled.

As described above, the communication data, which contains the platform type data, is exchanged between players, that is to say, between the card issuer and the service provider. The card issuer or the service provider, which receives this communication data, is described using an operation flowchart (FIG. 18). In the first place, the communication data is received, and then the platform type data contained in the data is referred to (step 1801). Whether or not a card ID of the smart card currently being processed can be read by companies other than the card issuer is judged using the platform type data (step 1802). If the card ID can be read, the first processing of the present invention is performed (step. 1803). If the card ID cannot be read, the processing in the second embodiment according to the present invention is performed (step 1804). When exchange the communication data between the card issuer and the service provider, two or more kinds of smart cards can be handled by performing the processing shown in FIG. 18 before everything else.

By the way, although there are two or more kinds of smart cards, such as a contact smart card, and a contactless smart card, it is needless to say that the present invention is applicable regardless of a configuration itself of such a smart card.

According to present invention, if the user wants to load an application in a reissued card dynamically, the service provider, which accepts the loading request, can know by the present invention that the smart card is the reissued card. In addition, it becomes possible to verify whether or not the application reloading request from the user is an appropriate request. Moreover, according to the present invention, the above-mentioned verification is possible in both cases: in a case where third parties other than the card issuer can read the card ID and in a case where the third parties cannot read the card ID.

When loading the application in the smart card, the conventional method was required to perform the same procedures as the normal application loading even if the smart card is a reissued card and the same application was loaded in the old card. If the present invention is used, the service provider can search information on the corresponding old card from the reissued card. Therefore, when loading the application in the reissued card, it is possible to simplify the examination to a large extent by referring to user credit information at the time of the application loading in the old card. Furthermore, if the application loading is charged, accounting information of the old card as well as the user credit information can be referred to. Because of it, operation of different charges, that is to say, a charge for normal loading, a charge for reissuance loading, and the like, also become possible.

Because the application concerned includes various kinds of inventions covering many things, its main forms will be exemplified as follows.

A first form of the present invention relates to a database in a smart card issuance/management system that uses the first method, and that issues and manages a smart card. In other words, this form is a database in a smart card issuance/management system characterized in that
   said database stores data having a structure comprising identification data of a reissued card, and identification data of an old card corresponding to the reissued card, in pairs, for the purpose of associating the reissued card with the old card when reissuing a smart card.

A second form of the present invention relates to a database in a smart card service providing/managing system that uses the first method, and that executes and manages services by loading an application in a smart card. In other words, this form is a database in a smart card service providing/managing system characterized in that
   said database stores data having a structure comprising the following data in pairs as data that is received from a card issuer as smart card reissuance information: identification data of a reissued card; and identification data of an old card corresponding to the reissued card.

In other words, this form is a database in a smart card issuance/management system characterized in that
   said database includes a message ID for uniquely identifying an electronic message exchanged with a service provider;
   said message ID has been provided when loading an application in an old card corresponding to a reissued card, as information related to the reissued card, for the purpose of associating the reissued card with the old card when reissuing a smart card; and
   a search using a reissued card ID as a key permits the message id to be extracted. In this case, extraction of the message ID means that included data is searched by contrasting the card ID with the message ID using, for example, the reissued card ID held in a hard disk, etc. as a key.

A fourth form of the present invention relates to a database in a smart card service providing/managing system that uses the second method, and that executes and manages services by loading an application in a smart card.

In other words, this form is a database in a smart card service providing/managing system characterized in that
   said database includes a message ID for uniquely identifying an electronic message exchanged with a card issuer;
   said electronic message has been provided when loading a requested application in an old card corresponding to a reissued card, as data received from the card issuer as smart card reissuance information, when an application loading request is issued by a user to a reissued card; and
   a search using this message ID as a key permits information, which relates to application loading when loading the application in the old card, to be extracted.

A fifth form of the present invention relates to a smart card issuance/management system that uses the first method, and that issues and manages a smart card.

In other words, this form is a smart card issuance/management system comprising a smart card management database for managing given smart card management information relating to a smart card, and a smart card issuance/management processing unit.

This smart card issuance/management processing unit comprises:
   a means for accepting a reissuance request from a card user, as smart card reissuance notification;
   a means for reissuing a card for the user;
   a means for generating communication data using smart card related data, said communication data is exchanged with a smart card service providing/managing system, which executes and manages services using a smart card, to achieve the smart card reissuance notification;
   a means for receiving the communication data relating to the smart card reissuance notification from the smart card service providing/managing system; and
   a means for transmitting the communication data relating to the smart card reissuance notification to the smart card service providing/managing system.

A sixth form of the present invention relates to a smart card service providing/managing system that uses the first method, and that executes and manages services by loading an application in a smart card.

In other words, this form comprises: a smart card application management database for managing given smart card application management information relating to an application loaded in a smart card; and a smart card application issuance/management processing unit.

This smart card application issuance/management processing unit comprises:
   a means for accepting a request from a card user for reloading an application in a reissued card, as smart card reissuance notification;
   a means for checking whether or not the card is the reissued card;
   a means for reloading the application in the card;
   a means for generating communication data using the smart card application management information, said communication data is exchanged with a smart card issuance/management system, which issues and manages a smart card, to achieve the smart card reissuance notification;
   a means for receiving the communication data relating to the smart card reissuance notification from the smart card issuance/management system; and
   a means for transmitting the communication data relating to the smart card reissuance notification to the smart card issuance/management system.

A seventh form of the present invention relates to a smart card issuance/management system that uses the second method, and that issues and manages a smart card.

In other words, this form comprises: a smart card management database for managing given smart card management information relating to a smart card; and a smart card issuance/management processing unit.

This smart card issuance/management processing unit comprises:
   a means for accepting a reissuance request from a card user, as smart card reissuance notification;
   a means for reissuing a card for the user;
   a means for generating communication data using smart card related data, said communication data is exchanged with a smart card service providing/managing system, which executes and manages services using a smart card, to achieve the smart card reissuance notification;
   a means for receiving the communication data relating to the smart card reissuance notification from the smart card service providing/managing system; and
   a means for transmitting the communication data relating to the smart card reissuance notification to the smart card service providing/managing system.

An eighth form of the present invention relates to a smart card service providing/managing system that uses the second method, and that executes and manages services by loading an application in a smart card.

In other words, this form comprises: a smart card application management database for managing given smart card application management information relating to an application loaded in a smart card; and a smart card application issuance/management processing unit.

This smart card application issuance/management processing unit comprises:
- a means for accepting a request from a card user for reloading an application in a reissued card, as smart card reissuance notification;
- a means for checking whether or not the card is the reissued card;
- a means for reloading the application in the card;
- a means for generating communication data using the smart card application management information, said communication data is exchanged with a smart card issuance/management system, which issues and manages a smart card, to achieve the smart card reissuance notification;
- a means for receiving the communication data relating to the smart card reissuance notification from the smart card issuance/management system; and
- a means for transmitting the communication data relating to the smart card reissuance notification to the smart card issuance/management system.

Furthermore, as regards the forms of the present invention, the following forms are also useful. Concerning the smart card issuance/management system of the fifth form, identification data of a smart card, which will be reissued, can be read by a system other than the smart card issuance/management system. As a part of the communication data transmitted to the smart card service providing/managing system, the smart card issuance/management processing unit includes card identification data of the reissued card, and card identification data of the old card corresponding to the reissued card.

Concerning the smart card service providing/managing system of the sixth form, identification data of a smart card, which is a reissued target, can be read by a system other than the smart card issuance/management system. As a part of the communication data received from the smart card issuance/management system, the smart card application issuance/management processing unit includes card identification data of the reissued card, and card identification data of the old card corresponding to the reissued card.

Concerning the smart card issuance/management system of the seventh form, identification data of a smart card, which will be reissued, cannot be read by a system other than the smart card issuance/management system. As a part of the communication data received from the smart card service providing/managing system, the smart card issuance/management processing unit includes smart card attribute information, which cannot be decrypted by the service provider after reading from the reissued card, and identification data of an application for which a reloading request is issued from a user. As a part of the communication data transmitted to the smart card service providing/managing system, the smart card issuance/management processing unit includes card attribute data indicating whether or not the card is a reissued card, and an identification number of an electronic message used when loading the application in the old card.

Concerning the smart card service providing/managing system of the eighth form, identification data of a smart card, which will be reissued, cannot be decrypted by a system other than the smart card issuance/management system. As a part of the communication data transmitted to the smart card issuance/management system, the smart card application issuance/management processing unit includes smart card attribute information, which cannot be decrypted by the service provider after reading from the reissued card, and identification data of an application for which a reloading request is issued from a user. As a part of the communication data received from the smart card issuance/management system, the smart card application issuance/management processing unit includes card attribute data indicating whether or not the card is a reissued card, and identification numbers of transmission/reception messages used when loading the application in the old card.

Moreover, a smart card issuance/management system, which uses both of the first method and the second method, is extremely useful for practical use. In other words, this form is a smart card issuance/management system that has functions of the fifth and the seventh forms at the same time. This form issues and manages two or more kinds of cards. This form has a type identifier of a smart card's card OS as a part of the smart card related data, and a type identifier of a smart card's card OS as a part of information on the communication data. Using the type identifier of the smart card's card OS, the smart card system judges which method should be selected from the first and the second methods.

Moreover, a smart card service providing/managing system, which uses both of the first method and the second method, is extremely useful for practical use in a like manner. More specifically, this form has functions of the sixth and the eighth forms at the same time.

This smart card service providing/managing system has a type identifier of a smart card's card OS as a part of the smart card application management information, and a type identifier of a smart card's card OS as a part of information on the communication data.

What is more, the present invention may have functions as follows.

A first function is a card issuer system that has a method for substituting user credit information. To be more specific, in the card issuer system, for example, the fifth or the seventh form is provided with a means by which when loading an application in the smart card, if the card issuer carries out credit investigation of a user, and if the smart card is a reissued card, the smart card issuance/management processing unit substitutes credit investigation carried out when a corresponding old card was used, or refers to the credit investigation.

A second function is a service provider system that has a method for substituting user credit information. To be more specific, in the service provider system, for example, the sixth or the eighth form is provided with a means by which when loading an application in the smart card, if the service provider carries out credit investigation of a user, and if the smart card is a reissued card, the smart card application issuance/management processing unit substitutes credit investigation carried out when a corresponding old card was used, or refers to the credit investigation.

Furthermore, it is useful to have functions of charging additionally, which are important for practical use.

For example, its form is a card issuer system that discriminates charges at the time of loading. More specifically, for example, the fifth or the seventh form is provided with a method by which when loading an application in a smart card, if the card issuer charges the service provider, the smart card issuance/management processing unit discriminates a charge, which is made when the smart card is a reissued card, from a charge at the time of normal application loading.

In addition, another form is a service provider system that discriminates charges at the time of loading. More specifically, for example, the sixth or the eighth form is provided with a method by which when loading an application in a smart card, if the service provider charges the card user, the smart card application issuance/management processing unit discriminates a charge, which is made when the smart card is a reissued card, from a charge at the time of normal application loading.

According to a storage medium of the present invention, said storage medium simplifies reissuance of a smart card and reloading of an application, and is useful because a safe method is used for security.

Moreover, according to the various kinds of smart card systems of the present invention, it is possible to simplify reissuance of a smart card and reloading of an application, and to operate them using a safe method for security.

By the way, there are the following technical matters that relates to the embodiments of the present invention.

1. A storage medium that is provided in a smart card system for issuing and managing a smart card, and that can be read by a computer, wherein:
    said storage medium comprises:
        a first data area in which identification data of a reissued smart card is stored; and
        a second data area in which identification data of an old smart card corresponding to the reissued card is stored; and
    the identification data of the reissued smart card and the identification data of the old smart card are associated with each other so that each of the identification data can be read using the other identification data.

2. A storage medium that is provided in a smart card system for executing and managing services by loading an application in a smart card, and that can be read by a computer, wherein:
    said storage medium comprises:
        a first data area in which identification data of a reissued smart card is stored; and
        a second data area in which identification data of an old smart card corresponding to the reissued card is stored; and
    the identification data of the reissued smart card and the identification data of the old smart card are associated with each other so that each of the identification data can be read using the other identification data.

3. A storage medium that is provided in a smart card system for issuing and managing a smart card, and that can be read by a computer, wherein:
    said storage medium comprises:
        a first data area in which identification data of a reissued smart card is stored; and
        a second data area for storing identification data that was used when an application in an old smart card corresponding to the reissued smart card has been loaded, and that uniquely identifies an electronic message exchanged with a service provider; and
    the identification data, which uniquely identifies the electronic message exchanged with the service provider, can be read according to the identification data of the reissued smart card.

4. A database that is provided in a smart card system for executing and managing services by loading an application in a smart card, and that can be read by a computer, wherein:
    said database comprises at least:
        a data area for storing identification data that was used when a requested application in an old smart card corresponding to the reissued smart card has been loaded, and that uniquely identifies an electronic message exchanged with a card issuer; and
        a data area for storing information related to application loading used when the application has been loaded in the old smart card; and
    the information related to application loading, which was used when the application has been loaded in the old smart card, can be read according to a third identification data that uniquely identifies the electronic message exchanged with the card issuer.

5. A smart card system comprising:
    a database device that can store given smart card related data relating to a smart card, and that can be read by a computer; and
    a smart card issuance/management processing unit comprising:
        a means for accepting a reissuance request from a third party;
        a means for issuing a smart card for said third party;
        a means for generating communication data using the smart card related data that is stored in the database device, said communication data is exchanged with a smart card service providing/managing system, which executes and manages services using a smart card, to notify smart card reissuance;
        a means for receiving desired data for the smart card reissuance from the smart card service providing/managing system; and
        a means for transmitting the data for the smart card reissuance to the smart card service providing/managing system.

6. A smart card system comprising:
    a database device that can store given smart card application management information relating to an application loaded in a smart card, and that can be read by a computer; and
    a smart card application issuance/management processing unit comprising:
        a means for accepting a request from a card user for application reloading in a reissued card;
        a means for judging whether or not the smart card is a reissued card;
        a means for loading an application in the smart card;
        a means for generating data using smart card application management information that is stored in the database device, said data is exchanged with a smart card issuance/management system, which issues and manages the smart card, to reissue the smart card;
        a means for receiving the data relating to the smart card reissuance notification from the smart card issuance/management system; and
        a means for transmitting the data relating to the smart card reissuance notification to the smart card issuance/management system.

7. A smart card system comprising:
    a database device that can store smart card related data relating to a smart card, and that can be read by a computer; and
    a smart card issuance/management processing unit comprising:
        a means for accepting a reissuance request from a third party;
        a means for issuing a smart card for said third party;
        a means for generating communication data exchanged with a smart card service providing/managing system, which executes and manages services using the smart card, using smart card related data stored in a database device in order to reissue the smart card, said communication data comprises at least: information indicating whether or not the smart card is a reissued card; identification data for identifying content of communication with the smart card service providing/managing system; and type identification data indicating a type of an operation system on which the smart card is operated;

a means for receiving desired data relating to the smart card reissuance from the smart card service providing/managing system; and a means for transmitting the desired data relating to the smart card reissuance notification to the smart card service providing/managing system.

8. A smart card service providing/managing system comprising:

a database device that can store given smart card application management information relating to an application loaded in a smart card, and that can be read by a computer; and a smart card application issuance/management processing unit comprising:

a means for accepting a request from a third party for application reloading in a reissued card;

a means for judging whether or not the smart card is a reissued card;

a means for loading an application in the smart card;

a means for generating communication data using smart card application management information that is stored in the database device, said communication data is exchanged with a smart card issuance/management system, which issues and manages the smart card, to reissue the smart card;

a means for receiving desired data relating to the smart card reissuance from the smart card issuance/management system; and a means for transmitting the desired data relating to the smart card reissuance to the smart card issuance/management system.

9. A smart card system comprising:

a database device that can store given smart card related data relating to a smart card, and that can be read by a computer; and a smart card issuance/management processing unit comprising:

a means for accepting a reissuance request from a third party;

a means for reissuing a smart card for the user;

a means for generating data communicated with a smart card service providing/managing system, which executes and manages services using the smart card, in order to notify smart card reissuance, said data includes at least type identification data indicating a type of an operation system on which the smart card is operated;

a means for receiving desired data for the smart card reissuance notification from the smart card service providing/managing system; and a means for transmitting data for the smart card reissuance notification, which includes at least the type identification data indicating the type of the operation system on which the smart card is operated, to the smart card service providing/managing system.

10. A smart card system comprising:

a database device that can store given smart card application management information relating to an application loaded in a smart card, and that can be read by a computer; and a smart card application issuance/management processing unit comprising:

a means for accepting a request from a card user for application reloading in a reissued card;

a means for judging whether or not the smart card is a reissued card;

a means for loading an application in the smart card;

a means for generating data using smart card application management information that is stored in the database device, said data is exchanged with a smart card issuance/management system, which issues and manages the smart card, to notify smart card reissuance;

a means for receiving data for the smart card reissuance notification, which includes at least type identification data indicating a type of an operation system on which the smart card is operated, from the smart card issuance/management system; and a means for transmitting the data relating to the smart card reissuance notification to the smart card issuance/management system.

11. A smart card system according to either of the reference number 5 or 7, comprising:

a means by which if the smart card is a reissued card, a smart card issuance/management processing unit reads data relating to credit investigation, which has been carried out when a corresponding old card was used, from the database device.

12. A smart card system according to either of the reference number 6 or 8, comprising:

a means by which if the smart card is a reissued card, a smart card application issuance/management processing unit reads data relating to credit investigation, which has been carried out when a corresponding old card was used, from the database device.

13. A smart card system according to either of the reference number 5 or 7, comprising:

a means by which when loading an application in a smart card, the smart card issuance/management processing unit discriminates a charge, which is made when the smart card is a reissued card, from a charge at the time of normal application loading.

14. A smart card system according to either of the reference number 6 or 8, comprising:

a means by which when loading an application in a smart card, the smart card application issuance/management processing unit discriminates a charge, which is made when the smart card is a reissued card, from a charge at the time of normal application loading.

What is claimed is:

1. A smart card system for managing an initial issuance and a re-issuance of an IC card comprising a data processing unit in an integrated circuit, a memory, and a terminal connected to a network, comprising:

a smart card issuance system configured to perform issuance and management of a smart card; and a smart card service providing system configured to perform issuance and management of an application loaded on the smart card, wherein the smart card issuance system and the smart card service providing system are operatively connected to each other through a network such that information exchange is achieved by transmitting and receiving electronic messages through the network.

each of the electronic messages, which is exchanged between the smart card issuance system and smart card service providing system, is uniquely identified using a message ID, data of the smart card issuance system and the smart card service providing system is stored using the message ID as a key, and the information exchange between the smart card issuance system and the smart card service providing system includes communication through the network connections wherein at the time of initial issuance of the smart card, the smart card issuance system sends an application loading permission to the smart card service providing system to permit loading an application into the smart card through a terminal, at the time of the initial issuance of the smart card, the smart card service providing system sends the application loading permission and the application to the smart card and loads the application into the smart card through the terminal, and at the time of the reissuance of the smart card, the smart card service providing system receives card attribute data from the smart card, which can be identified only by the card issuer, sends the card attribute data and an application ID of the application to the smart card issuance system, the smart card issuance system searches the message ID which was used when the smart card issuance system sent the application loading permission for loading the application to the smart card using the sent card attribute data, the card attribute data identifying the smart card service providing system, and sends the message ID to the smart card service providing system, the message ID having been used when the smart card issuance system sent the application loading permission for loading the application to the smart card, and the smart card service providing system searches an examination result of permission for loading the application at the time of initial loading application using the message ID as the key and loads the application into the smart card through the terminal based on the examination result of permission.

2. The ID card system according to claim 1, wherein the message IC is at least one of a company identification data of the card issuer, a company identification data of the service provider, and a sequence number of the electric message in combination.

3. The IC card system according to claim 1, wherein the card attribute data is a card ID encrypted using a card issuer's own public key.

4. A smart card system configured to perform issuance and management of a smart card, the smart card comprising a data processing unit in an integrated circuit, a memory, and a terminal connected to a network, and configured to connect to a smart card service providing system through a network, wherein information exchange is achieved by transmitting and receiving electronic messages through the network;

each of the electronic messages, which is exchanged between the smart card issuance system and smart card service providing system, is uniquely identified using a message ID;

data of the smart card issuance system and the smart card service providing system is stored using the message ID as a key;

at the time of initial issuance of the smart card, the smart card issuance system sends an application loading permission, to the smart card service providing system to permit loading an application into the smart card through a terminal, and at the time of initial issuance of the smart card, the smart card issuance system searches a message ID which was used us a key when the smart card issuance system sent the application loading permission for loading the application to the smart card, the application loading permission using card attribute data which identifies the smart card and can be identified only by the card issuer, and sends the message ID of the application loading permission using the card attribute data, the message ID being used when the smart card issuance system sent the application loading permission for loading the application to the smart card through the terminal.

5. The smart card issuance/management system according to claim 4, wherein the message ID is at least one of a company identification data of the card issuer, a company identification data of the service provider, and a sequence number of the electric message in combination.

6. The smart card issuance/management system according to claim 4, wherein the card attribute information is a card ID encrypted using the card issuer's own public key.

7. A smart card service providing/managing system configured to perform issuance and management of a smart card, the smart card comprising a data processing unit in an integrated circuit, a memory, and a terminal connected to a network, and configured to connect to an IC card service issuance system configured to perform issuance and management of an application loaded on the smart card, through a network, wherein information exchange is achieved by transmitting and receiving electronic messages through the network;

each of the electric messages, which is exchanged between the smart card issuance system and smart card service providing system, is uniquely identified using a message ID;

data of the smart card issuance system and the smart card service providing system is stored using the message ID as a key;

at the time of initial issuance of the smart card, the smart card service providing system receives an application loading permission from the smart card issuance system, which permits the smart card service providing system to load an application into the smart card, and loads the application to the smart card through a terminal; and at the time of reissuance of the smart card, the service providing system receives card attribute data from the smart card, which can be identified only by the card issuer, and which identifies the smart card, sends the card attribute data and an application ID of the application, receives the message ID of the application loading permission, which is used when the smart card issuance system sends the application loading permission for loading the application to the smart card, searches an examination result of permission for loading the application at the time of initial loading application using the message ID as the key and loads the application into the smart though the terminal based on the examination result of permission.

8. The smart card service providing/managing system according to claim 7, wherein the message ID is at least one of a company identification data of the card issuer, a company identification data of the service provider, and a sequence number of the electric message in combination.

9. The smart card service providing/managing system according to claim 7, wherein the card attribute information is a card ID encrypted using the card issuer's own public key.

* * * * *